US006805501B2

(12) United States Patent
Winberg et al.

(10) Patent No.: US 6,805,501 B2
(45) Date of Patent: Oct. 19, 2004

(54) SYSTEM AND METHOD FOR DIGITAL FILM DEVELOPMENT USING VISIBLE LIGHT

(75) Inventors: Paul N. Winberg, Austin, TX (US); Stanley Kowalski, III, Wilbraham, MA (US); Michael W. Shields, Sr., Palmer, MA (US); David J. Bassett, Ware, MA (US); William A. Gagnon, Belchertown, MA (US); Michael R. Thering, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 3 days.

(21) Appl. No.: 10/197,620

(22) Filed: Jul. 16, 2002

(65) Prior Publication Data

US 2003/0133710 A1 Jul. 17, 2003

Related U.S. Application Data

(60) Provisional application No. 60/305,934, filed on Jul. 16, 2001.

(51) Int. Cl.[7] .................................................. G03D 3/08
(52) U.S. Cl. ..................... 396/612; 396/599; 396/613; 396/620; 342/348.3
(58) Field of Search .............................. 396/411.1, 387

(56) References Cited

U.S. PATENT DOCUMENTS

| | | | |
|---|---|---|---|
| 2,404,138 A | 7/1946 | Mayer ............................ | 95/94 |
| 3,520,689 A | 7/1970 | Nagae et al. ................... | 96/55 |
| 3,520,690 A | 7/1970 | Nagae et al. ................... | 96/55 |
| 3,587,435 A | 6/1971 | Chioffe .......................... | 95/89 |
| 3,615,479 A | 10/1971 | Kohler et al. .................. | 96/48 |
| 3,615,498 A | 10/1971 | Arai ............................... | 96/55 |
| 3,617,282 A | 11/1971 | Bard .............................. | 96/59 |
| 3,747,120 A | 7/1973 | Stemme ....................... | 346/75 |
| 3,833,161 A | 9/1974 | Krumbein ..................... | 226/92 |
| 3,903,541 A | 9/1975 | Von Meister et al. ....... | 354/317 |

(List continued on next page.)

FOREIGN PATENT DOCUMENTS

| | | | | |
|---|---|---|---|---|
| EP | 0 261 782 A2 | 8/1987 | ............ | H04N/1/46 |
| EP | 0 422 220 A1 | 3/1989 | ............ | A61B/6/03 |
| EP | 0 482 790 B1 | 9/1991 | ............ | H04N/1/40 |
| EP | 0 525 886 A3 | 7/1992 | ............ | G03D/5/00 |
| EP | 0 580 293 A1 | 6/1993 | ............ | H04N/1/04 |
| EP | 0 580 293 A1 | 1/1994 | ............ | H04N/1/04 |
| EP | 0 601 364 A1 | 6/1994 | .......... | H04N/1/387 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

(List continued on next page.)

*Primary Examiner*—D. Rutledge
(74) *Attorney, Agent, or Firm*—Simon, Galasso & Frantz Plc; David A. Novais

(57) ABSTRACT

One aspect of the invention is a system for digital dye color film processing. In one embodiment, a developer station applies a processing solution to film to initiate development of metallic silver grains and at least one dye image within the film. A scanning system illuminates the coated film with light having at least one frequency within the visible portion of the electromagnetic spectrum. The light interacts with the silver and at least one dye image within the film. The scanning station measures the light from the film and produces sensor data that is communicated to a data processing system. The data processing system processes the sensor data to produce a digital image. The digital image can then be output to an output device, such as a printer, monitor, memory device, and the like.

4 Claims, 12 Drawing Sheets

U.S. PATENT DOCUMENTS

| | | | | |
|---|---|---|---|---|
| 3,946,398 A | | 3/1976 | Kyser et al. | 346/1 |
| 3,959,048 A | | 5/1976 | Stanfield et al. | 156/94 |
| 4,026,756 A | | 5/1977 | Stanfield et al. | 156/554 |
| 4,074,870 A | * | 2/1978 | Kaufman | 242/348.3 |
| 4,081,577 A | | 3/1978 | Horner | 427/424 |
| 4,113,192 A | * | 9/1978 | Osanai | 242/348.3 |
| 4,142,107 A | | 2/1979 | Hatzakis et al. | 250/571 |
| 4,215,927 A | | 8/1980 | Grant et al. | 354/317 |
| 4,249,985 A | | 2/1981 | Stanfield | 156/554 |
| 4,265,545 A | | 5/1981 | Slaker | 356/431 |
| 4,301,469 A | | 11/1981 | Modeen et al. | 358/75 |
| 4,490,729 A | | 12/1984 | Clark et al. | 346/75 |
| 4,501,480 A | | 2/1985 | Matsui et al. | 354/298 |
| 4,564,280 A | | 1/1986 | Fukuda | 354/317 |
| 4,594,598 A | | 6/1986 | Iwagami | 346/140 |
| 4,621,037 A | | 11/1986 | Kanda et al. | 430/30 |
| 4,623,236 A | | 11/1986 | Stella | 354/318 |
| 4,633,300 A | | 12/1986 | Sakai | 358/41 |
| 4,636,808 A | | 1/1987 | Herron | 346/75 |
| 4,666,307 A | | 5/1987 | Matsumoto et al. | 356/404 |
| 4,670,779 A | | 6/1987 | Nagano | 358/75 |
| 4,736,221 A | | 4/1988 | Shidara | 354/317 |
| 4,741,621 A | | 5/1988 | Taft et al. | 356/376 |
| 4,745,040 A | | 5/1988 | Levine | 430/21 |
| 4,755,844 A | | 7/1988 | Tsuchiya et al. | 354/317 |
| 4,777,102 A | | 10/1988 | Levine | 430/21 |
| 4,796,061 A | | 1/1989 | Ikeda et al. | 355/73 |
| 4,814,630 A | | 3/1989 | Lim | 250/578 |
| 4,821,114 A | | 4/1989 | Gebhardt | 358/75 |
| 4,845,551 A | | 7/1989 | Matsumoto | 358/80 |
| 4,851,311 A | | 7/1989 | Millis et al. | 430/30 |
| 4,857,430 A | | 8/1989 | Millis et al. | 430/30 |
| 4,860,044 A | * | 8/1989 | Kanai et al. | 396/620 |
| 4,875,067 A | | 10/1989 | Kanzaki et al. | 354/325 |
| 4,969,045 A | | 11/1990 | Haruki et al. | 358/228 |
| 4,994,918 A | | 2/1991 | Lingemann | 358/214 |
| 5,027,146 A | | 6/1991 | Manico et al. | 354/299 |
| 5,030,978 A | * | 7/1991 | Stoneham et al. | 396/514 |
| 5,034,767 A | | 7/1991 | Netz et al. | 354/317 |
| 5,101,286 A | | 3/1992 | Patton | 358/487 |
| 5,124,216 A | | 6/1992 | Giapis et al. | 430/30 |
| 5,155,596 A | | 10/1992 | Kurtz et al. | 358/214 |
| 5,196,285 A | | 3/1993 | Thomson | 430/30 |
| 5,200,817 A | | 4/1993 | Birnbaum | 358/80 |
| 5,212,512 A | | 5/1993 | Shiota | 354/319 |
| 5,231,439 A | | 7/1993 | Takahashi et al. | 354/313 |
| 5,235,352 A | | 8/1993 | Pies et al. | 346/140 |
| 5,255,408 A | | 10/1993 | Blackman | 15/308 |
| 5,266,805 A | | 11/1993 | Edgar | 250/330 |
| 5,267,030 A | | 11/1993 | Giorgianni et al. | 358/527 |
| 5,292,605 A | | 3/1994 | Thomson | 430/30 |
| 5,296,923 A | | 3/1994 | Hung | 358/527 |
| 5,334,247 A | | 8/1994 | Columbus et al. | 118/411 |
| 5,350,651 A | | 9/1994 | Evans et al. | 430/21 |
| 5,350,664 A | | 9/1994 | Simons | 430/362 |
| 5,357,307 A | | 10/1994 | Glanville et al. | 354/324 |
| 5,360,701 A | | 11/1994 | Elton et al. | 430/501 |
| 5,371,542 A | | 12/1994 | Pauli et al. | 348/262 |
| 5,391,443 A | | 2/1995 | Simons et al. | 430/21 |
| 5,414,779 A | | 5/1995 | Mitch | 382/199 |
| 5,416,550 A | | 5/1995 | Skye et al. | 354/298 |
| 5,418,119 A | | 5/1995 | Simons | 430/507 |
| 5,418,597 A | | 5/1995 | Lahcanski et al. | 355/76 |
| 5,432,579 A | | 7/1995 | Tokuda | 354/293 |
| 5,436,738 A | | 7/1995 | Manico | 358/503 |
| 5,440,365 A | | 8/1995 | Gates et al. | 354/298 |
| 5,447,811 A | | 9/1995 | Buhr et al. | 430/20 |
| 5,448,380 A | | 9/1995 | Park | 358/520 |
| 5,452,018 A | | 9/1995 | Capitant et al. | 348/651 |
| 5,465,155 A | | 11/1995 | Edgar | 358/500 |
| 5,477,345 A | | 12/1995 | Tse | 358/500 |
| 5,496,669 A | | 3/1996 | Pforr et al. | 430/22 |
| 5,516,608 A | | 5/1996 | Hobbs et al. | 430/30 |
| 5,519,510 A | | 5/1996 | Edgar | 358/471 |
| 5,546,477 A | | 8/1996 | Knowles et al. | 382/242 |
| 5,550,566 A | | 8/1996 | Hodgson et al. | 345/202 |
| 5,552,904 A | | 9/1996 | Ryoo et al. | 358/518 |
| 5,563,717 A | | 10/1996 | Koeng et al. | 358/406 |
| 5,568,270 A | | 10/1996 | Endo | 358/298 |
| 5,576,836 A | | 11/1996 | Sano et al. | 358/302 |
| 5,581,376 A | | 12/1996 | Harrington | 358/518 |
| 5,587,752 A | | 12/1996 | Petruchik | 396/315 |
| 5,596,415 A | | 1/1997 | Cosgrove et al. | 358/296 |
| 5,627,016 A | | 5/1997 | Manico | 430/434 |
| 5,649,260 A | | 7/1997 | Wheeler et al. | 396/569 |
| 5,664,253 A | | 9/1997 | Meyers | 396/603 |
| 5,664,255 A | | 9/1997 | Wen | 396/627 |
| 5,667,944 A | | 9/1997 | Reem et al. | 430/359 |
| 5,678,116 A | | 10/1997 | Sugimoto et al. | 396/611 |
| 5,691,118 A | | 11/1997 | Haye | 430/357 |
| 5,695,914 A | | 12/1997 | Simon et al. | 430/379 |
| 5,698,382 A | | 12/1997 | Nakahanada et al. | 430/418 |
| 5,708,906 A | * | 1/1998 | Hashizume | 396/620 |
| 5,726,773 A | | 3/1998 | Mehlo et al. | 358/474 |
| 5,739,897 A | | 4/1998 | Frick et al. | 355/40 |
| 5,771,107 A | | 6/1998 | Fujimoto et al. | 358/464 |
| 5,790,277 A | | 8/1998 | Edgar | 358/487 |
| 5,835,795 A | | 11/1998 | Craig et al. | 396/6 |
| 5,835,811 A | | 11/1998 | Tsumura | 396/598 |
| 5,870,172 A | | 2/1999 | Blume | 355/27 |
| 5,880,819 A | | 3/1999 | Tanaka et al. | 355/75 |
| 5,892,595 A | | 4/1999 | Yamakawa et al. | 358/530 |
| 5,920,741 A | * | 7/1999 | Nishimoto | 396/612 |
| 5,930,388 A | | 7/1999 | Murakami et al. | 382/167 |
| 5,959,720 A | | 9/1999 | Kwon et al. | 355/38 |
| 5,963,662 A | | 10/1999 | Vachtsevanos et al. | 382/150 |
| 5,966,465 A | | 10/1999 | Keith et al. | 382/232 |
| 5,979,011 A | | 11/1999 | Miyawaki et al. | 15/308 |
| 5,982,936 A | | 11/1999 | Tucker et al. | 382/233 |
| 5,982,937 A | | 11/1999 | Accad | 382/239 |
| 5,982,941 A | | 11/1999 | Loveridge et al. | 382/260 |
| 5,982,951 A | | 11/1999 | Katayama et al. | 382/284 |
| 5,988,896 A | | 11/1999 | Edgar | 396/604 |
| 5,991,444 A | | 11/1999 | Burt et al. | 382/232 |
| 5,998,109 A | | 12/1999 | Hirabayashi | 430/434 |
| 6,000,284 A | | 12/1999 | Shin et al. | 73/150 |
| 6,005,987 A | | 12/1999 | Nakamura et al. | 382/294 |
| 6,030,131 A | * | 2/2000 | Shimamura et al. | 396/599 |
| 6,065,824 A | | 5/2000 | Bullock et al. | 347/19 |
| 6,069,714 A | | 5/2000 | Edgar | 358/487 |
| 6,088,084 A | | 7/2000 | Nishio | 355/75 |
| 6,089,687 A | | 7/2000 | Helterline | 347/7 |
| 6,101,273 A | | 8/2000 | Matama | 382/169 |
| 6,102,508 A | | 8/2000 | Cowger | 347/7 |
| 6,137,965 A | | 10/2000 | Burgeios et al. | 396/626 |
| 6,149,321 A | * | 11/2000 | Nishibata et al. | 396/612 |
| 6,200,738 B1 | | 3/2001 | Takano et al. | 430/362 |

FOREIGN PATENT DOCUMENTS

| | | | | |
|---|---|---|---|---|
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 878 777 A2 | 11/1998 | | G06T/5/40 |
| EP | 0 930 498 A2 | 12/1998 | | G01N/21/88 |
| WO | WO 90/01240 | 2/1990 | | H04N/1/40 |
| WO | WO 91/09493 | 6/1991 | | H04N/5/217 |
| WO | WO 97/25652 | 7/1997 | | G03D/5/00 |
| WO | WO 98/19216 | 5/1998 | | G03C/5/29 |
| WO | WO 98/25399 | 6/1998 | | H04N/1/38 |
| WO | WO 98/31142 | 7/1998 | | H04N/5/253 |

| | | | |
|---|---|---|---|
| WO | WO 93/34157 | 8/1998 | |
| WO | WO 98/34157 | 8/1998 | |
| WO | WO 98/34397 | 8/1998 | |
| WO | WO 99/43148 | 8/1999 | ............ H04N/1/00 |
| WO | WO 99/43149 | 8/1999 | .......... H04N/1/100 |
| WO | WO 01/01197 | 1/2001 | ............ G03D/5/00 |
| WO | WO 01/13174 A1 | 2/2001 | ............ G03D/5/06 |
| WO | WO 01/45042 A1 | 6/2001 | ............. G06T/5/00 |
| WO | WO 01/50192 A1 | 7/2001 | ........... G03C/7/407 |
| WO | WO 01/50193 A1 | 7/2001 | ........... G03C/7/407 |
| WO | WO 01/50194 A1 | 7/2001 | ........... G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

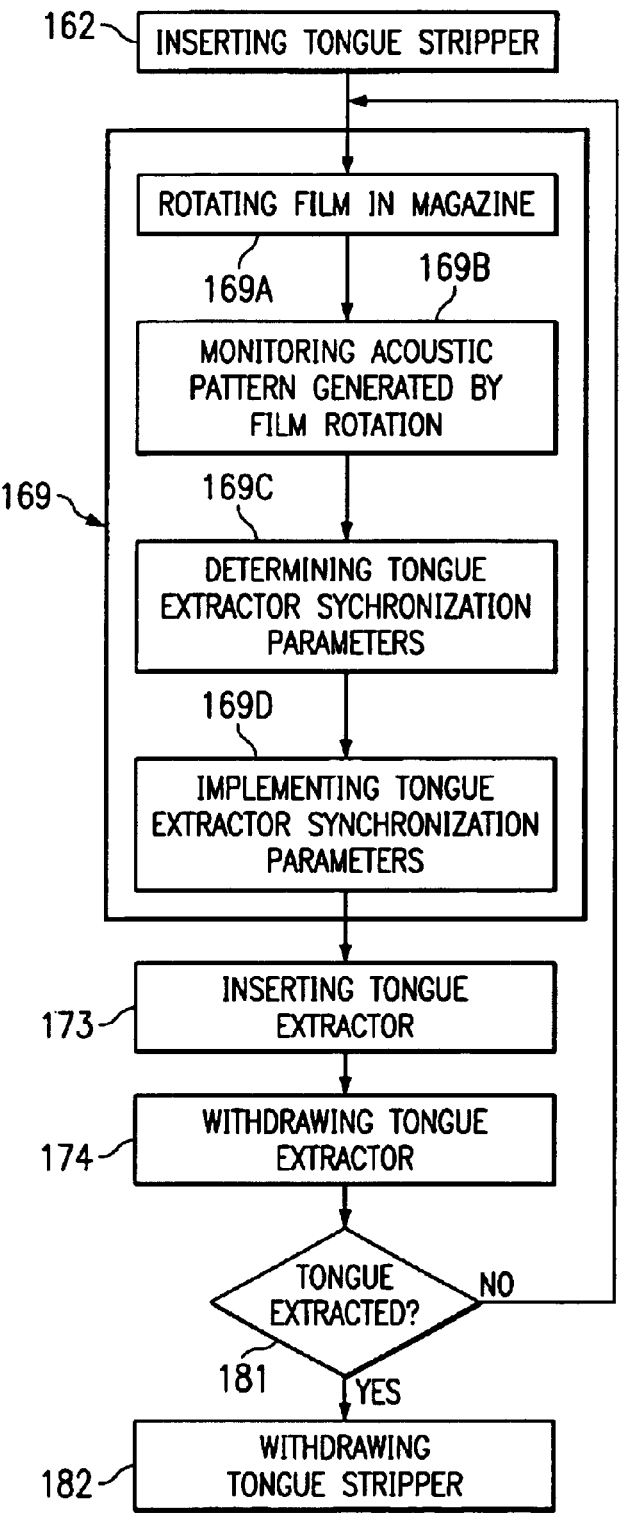

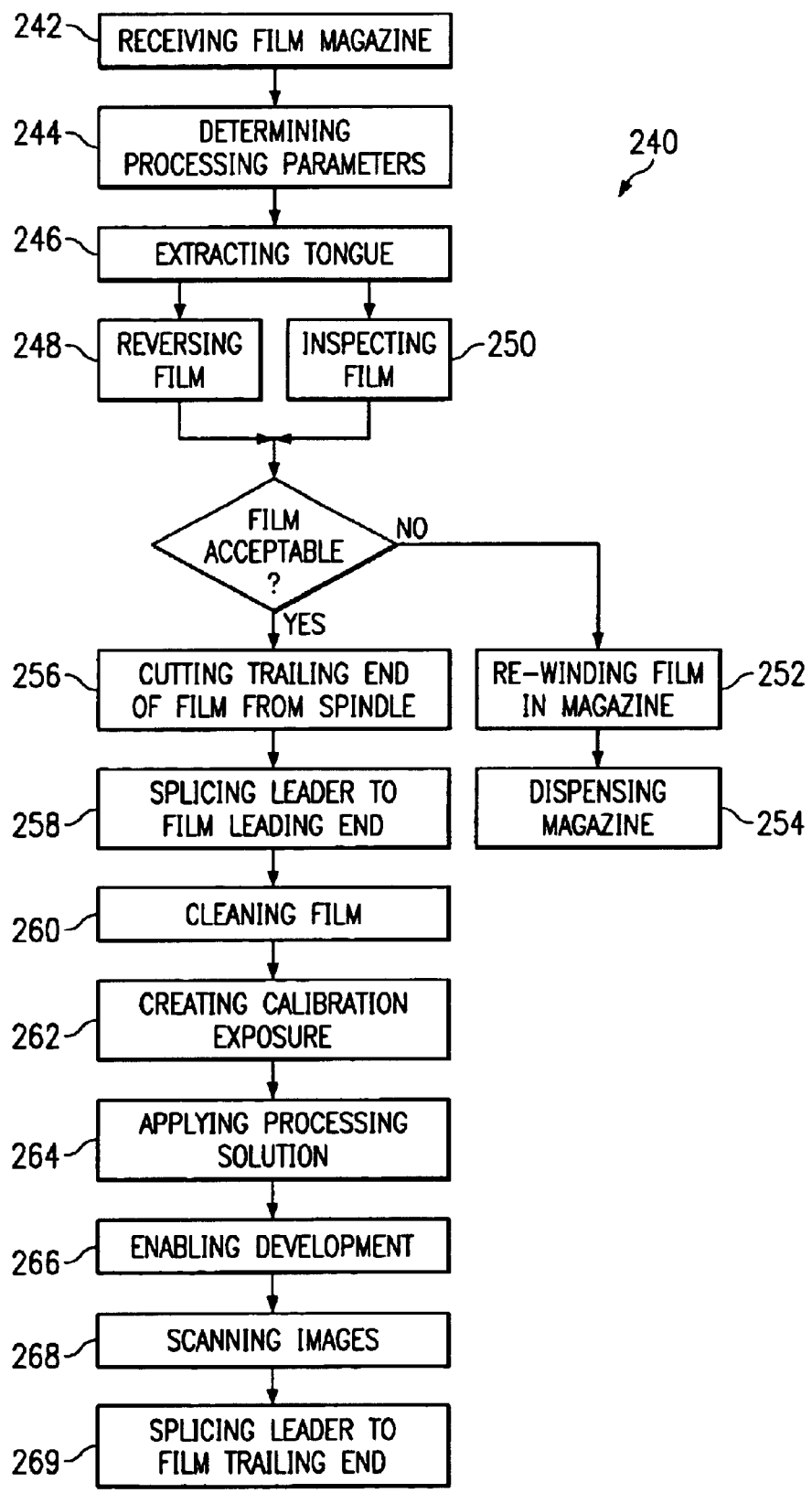

SYSTEM AND METHOD FOR DIGITAL FILM DEVELOPMENT USING VISIBLE LIGHT

CROSS REFERENCE TO RELATED APPLICATIONS

This application claims the benefit of U.S. Provisional Patent Application Ser. No. 60/305,934 filed Jul. 16, 2001 entitled "Improved System And Method For Digital Film Development Using Visible Light", of common assignee herewith.

BACKGROUND OF THE INVENTION

Images are used to communicate information and ideas. Images, including print pictures, film negatives, documents and the like, are often digitized to produce a digital image that can then be instantly communicated, viewed, enhanced, modified, printed or stored. The flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process, as generally described below.

Undeveloped film generally includes a clear base and one or more emulsion layers containing a dye coupler and a photosensitive material, such as silver halide, that is sensitive to electromagnetic radiation, i.e., light. In color films, independent emulsion layers are sensitized to different bands, or colors, of light. In general, one or more emulsion layers are sensitized to light associated with the colors of red, green and blue. When a picture is taken, the photosensitive material is exposed to light from a scene and undergoes a chemical change. The greater the intensity of light interacting with the photosensitive material, the greater the chemical change in the photosensitive material. The photographic film can then be chemically processed to produce a fixed image of the scene based on this chemical change.

In a traditional wet chemical developing process, the film is immersed and agitated in a series of tanks containing different processing solutions. The first tank typically contains a developing solution. The developing solution chemically reacts with the exposed silver halide to produce elemental metallic silver grains in each emulsion layer of the film. The metallic silver grains form a silver image within each emulsion layer of the film. The by-product of the chemical reaction combines with a dye coupler in each emulsion layer to create a dye cloud. The color of the dye cloud is complementary to the band of light the emulsion layer has been sensitized to. For example, the red sensitized layer typically produces a cyan dye image, the green sensitized layer a magenta dye image, and the blue sensitized layer a yellow dye image. The density of the silver image and the corresponding dye image in each emulsion layer are directly proportional to the intensity of light the film was exposed to. The developing process is generally stopped by removing the film from the developer tank and rinsing the developing solution from the film with water or an acidic solution.

Conventional wet chemical developing processes then removes both the silver image and the undeveloped silver halide grains from the film to produce a film negative having only a dye image within the film negative. To remove the silver image and undeveloped silver halide, the developed film is immersed and agitated in a tank of bleaching solution. The bleaching solution chemically oxidizes the metallic silver grains forming the silver image and converts the metallic silver grains into silver halide. The bleached film is then immersed and agitated in a tank of fixer solution. The fixer solution removes the silver halide from the film by dissolving the silver halide crystals. The fixer solution is thereby contaminated with dissolved silver compounds and becomes a hazardous waste byproduct of the wet chemical developing process. The film is then washed, stabilized and dried to produce a conventional film negative. The film negative can then be used to produce a corresponding image on photographic paper by methods known to those skilled in the art.

Conventional film digitization processes scan the film negative using a conventional electronic scanner to produce a digital image that electronically represents the photographic image. Conventional electronic film scanners generally operate by directing white light through the film negative. The light interacts with the dye image and the intensity of light transmitted through the film is recorded by a sensor that produces individual red, green and blue color data. The sensor color data is used to produce the digital image.

A relatively new process under development is digital film processing (DFP). DFP systems scan the film using light during the development process. DFP systems apply a thin coat of one or more film processing solutions to the film and then scan the film. Neither the processing solutions nor the silver compounds are substantially removed from the film before or after scanning the film. DFP systems may be designed in a number of configurations depending upon the method of film processing and the method of scanning the film. For example, the film may be processed by applying a developer solution, a developer solution and fixer solution, a developer solution, fixer solution, and The DFP scanning process is generally accomplished by measuring infrared light reflected from the developed silver image in the front and back emulsion layers, and measuring the infrared light transmitted through the film. The reflected and transmitted light measurements of the film provide data on the blue, red, and green sensitized emulsion layers, respectively. The measured reflected and transmitted light data is processed to produce the digital image.

SUMMARY OF THE INVENTION

One embodiment of the invention is an improved digital film processing system. In this embodiment, the improved digital film processing system includes a scanning system and a data processing system. The scanning system scans film and produces sensor data that is communicated to the data processing system. The film scanned by the scanning system includes silver and at least one dye cloud disposed within the film. The silver contained within the film may comprise developed metallic silver, silver halide, or both. The data processing system processes the sensor data to produce a full color digital image. The digital image can be output to any suitable output device, such as a monitor, printer, memory device, and/or the Internet. In a particular embodiment, the digital color film processing system is embodied as a self-service kiosk for processing film.

Another embodiment of the invention is a system for developing and processing film to produce a digital image. In this embodiment, the system includes a film processing system, a scanning system, and a data processing system. The film processing system operates to coat a processing solution onto the film that initiates development of a silver image and at least one dye cloud within the film. In a particular embodiment, the film processing system includes a halt station that operates to retard development of the coated film after the film has been developed for a predetermined amount of time. The halt station may operate by applying a halt solution to the coated film, chilling the film, drying the film, or any other suitable method for slowing the development of the film prior to scanning the film. The scanning system scans at least one of the dye images (cyan, magenta, yellow) within the coated film and outputs sensor data to the data processing system. The scanning system scans the coated film using at least one frequency of light within the visible portion of the electromagnetic spectrum. The data processing system receives and processes the sensor data to produce the digital image. The light used to scan the film may comprise blue light, red light, green light, any combination thereof, and any other suitable light, including infrared light. The scanning system may also operate to scan the film by measuring light transmitted through the film, reflected from the film, reflected and transmitted through the film, or any other suitable combination.

Another embodiment of the invention is a system for digitizing a developed film coated with a processing solution. In this embodiment, the system comprises at least one lighting system and at least one sensor system. The lighting system operates to illuminate the coated film with visible light. The sensor system operates to measure the light from the coated film and produce sensor data. In particular embodiments, the visible light includes blue light, green light, red light, or a suitable combination thereof. In yet another particular embodiment, the lighting system also operates to illuminate the film with infrared light.

Yet another embodiment of the invention is a film processing system. In this embodiment, the film processing system comprises an applicator station and a development station. The applicator station operates to coat a processing solution onto the film, wherein the processing solution initiates development of a silver image and at least one dye image within the film. The development station operates to substantially control the environment surrounding the coated film during development of the film. The film processing system may also include a halt station that operates to retard the development of the film after development of the film. In a particular embodiment, the halt station applies a halt solution to the film. The halt solution may comprise a fixer solution, bleach solution, stop solution, blix (bleach plus fixer) solution, any combination thereof, or any other suitable solution.

One implementation of the invention is a method for developing and digitizing exposed film having multiple emulsion layers containing silver halide. In this implementation, the method comprises coating a processing solution on the film to develop the exposed silver halide grains and produce at least one dye image within the coated film. The coated film is then scanned with light within the visible portion of the electromagnetic spectrum to produce a dye-silver record that is output as sensor data. The sensor data is then processed to produce a digital image. In a particular implementation, processing the sensor data includes processing the dye-silver record using a silver record to substantially remove the effects of silver within the film.

Another embodiment of the invention is the production of digital images produced by digitally processing film that has a silver image and at least one dye image within the film.

Digitally processing the film comprises scanning the film with light having at least one frequency within the visible light portion of the electromagnetic spectrum and processing the scan data to produce the digital images. In a particular embodiment, the light used to scan the film comprises red, green, and infrared light. In other embodiments, the film is scanned using light transmitted through the film, reflected from the film, reflected and transmitted through the film, or any other suitable combination.

The invention has several important technical advantages. Various embodiments of the invention may have none, some, or all of these advantages. An advantage of at least one embodiment is that environmentally hazardous effluents are not created by the removal of silver from the film. In particular, no water plumbing is required to process the film in accordance with at least one embodiment of the invention. As a result, this embodiment is less expensive that conventional wet chemical processing systems and can be located at any location. In contrast, conventional wet chemical processing of film requires water plumbing and removes the silver from the film, which produces environmentally hazardous effluents that are controlled by many government regulatory agencies.

Another advantage of at least one embodiment of the invention is that the invention can be embodied in a simple user operated film processing system, such as a self-service kiosk. In this embodiment, skilled technicians are not required, thereby reducing the cost associated with developing and processing film. In addition, at least one embodiment of the invention allows the film to be developed and processed faster than conventional wet chemical processing of the film.

Another advantage of at least one embodiment of the invention is that data corresponding to the dye clouds in the film is used to produce the digital image. In other embodiments, data corresponding to the silver image in the film is also used to produce the digital image. In contrast, conventional digital film processing generally uses infrared light to collect data corresponding only to the silver to produce a digital image. Accordingly, at least one embodiment produces a better digital image than produced by conventional digital film processing.

Other technical advantages will be readily apparent to one skilled in the art from the following figures, descriptions, and claims.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIG. 1C is a flow chart view depicting a method for extracting a tongue of a film from a film magazine;

FIG. 1G is a flow chart view depicting a method for processing film in a self service film processing system and in accordance with one embodiment of the invention;

FIG. 1I is a flow chart view depicting a method for processing film in a multiple film format developing system operable and in a self service film processing system in accordance with one embodiment of the invention;

FIGS. 2B-1 through 2B-4 are schematic diagrams illustrating various embodiments of a halt station shown in FIG. 2B;

FIG. 3 is a schematic diagram illustrating a scanning system shown in FIG. 1;

DETAILED DESCRIPTION OF THE INVENTION

Figure 1A:
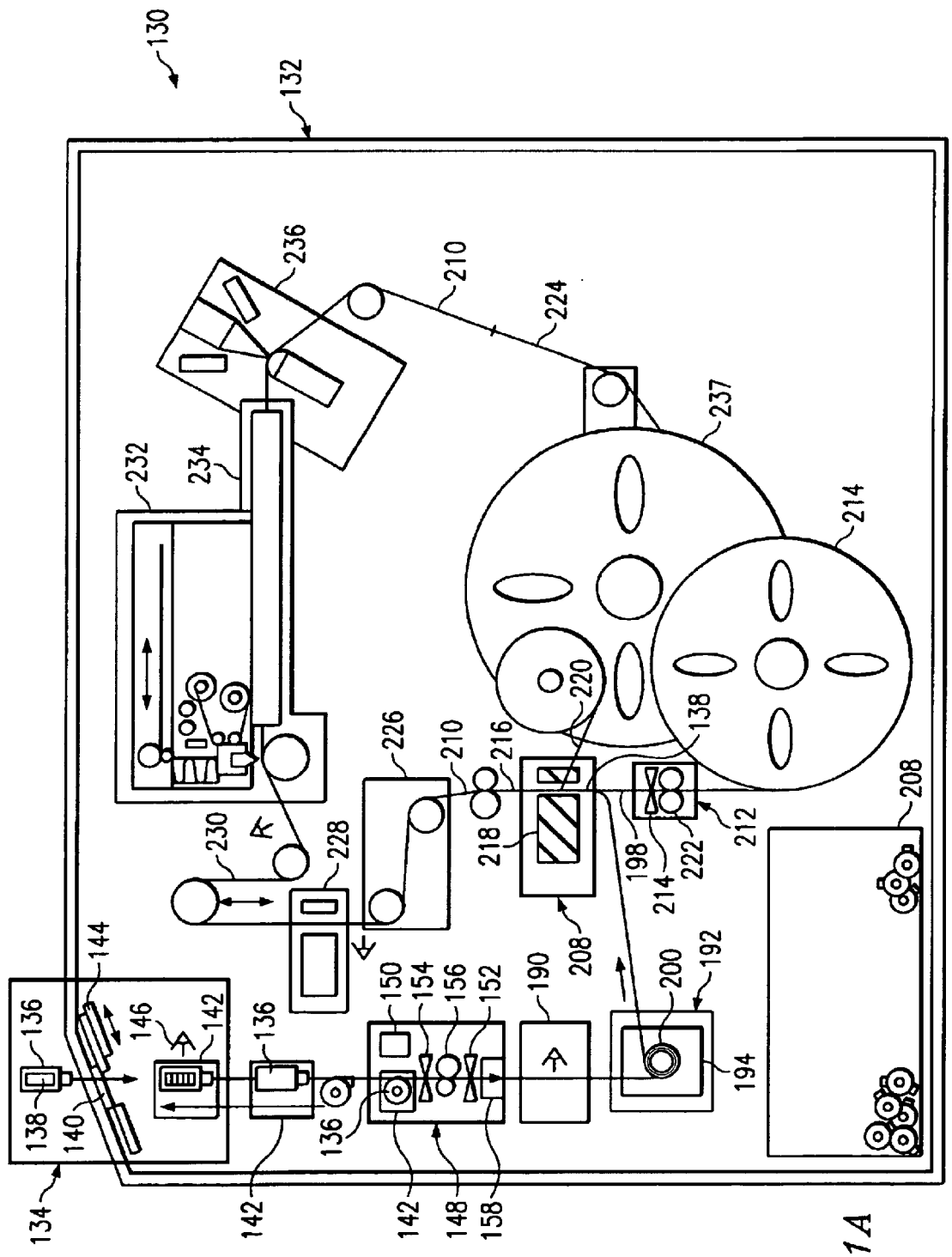
FIG. 1A is a schematic diagram of a film processing system operable in a self service film processing system in accordance with one embodiment of the invention.

FIGS. 1A through 5B illustrate various embodiments of an improved method and system for digital film processing system using visible light. During the film development process, each exposed frame of film produces a silver image and a corresponding dye image. As described in greater detail below, the digital color dye film processing system and method utilizes light within the visible portion of the electromagnetic spectrum to scan color dye image without washing the silver from the film. In certain embodiments, other frequencies of light, such as light in the infrared region of the electromagnetic spectrum, is utilized to scan at least one of the silver images. The scan data is then used to produce a digital image of the photographed scene. In a conventional photographic development process, the metallic silver and silver halide are removed from the film and the film is dried to produce a film negative. A conventional film scanner can then be used to scan the film negative to produce a digital image.

One embodiment of the disclosures made herein is an improved digital film development system. In this embodiment, the improved digital film development system comprises a data processing system and a film processing system that operates to digitize a film to produce a digital image for output to an output device. Film, as used herein, includes color, black and white, x-ray, infrared or any other type of film and is not meant to refer to any specific type of film or a specific manufacturer.

The data processing system comprises any type of computer or processor operable to process data. For example, the data processing system may comprise a personal computer manufactured by Apple Computing, Inc. of Cupertino, Calif. or International Business Machines of New York. The data processing system may also comprise any number of computers or individual processors, such as application specific integrated circuits (ASICs). The data processing system may include an input device operable to allow a user to input information into the improved digital film development system. Although the input device is illustrated as a keyboard, the input device may comprise any input device, such as a keypad, mouse, point-of-sale device, voice recognition system, memory reading device such as a flash card reader, or any other suitable data input device.

The data processing system includes image processing software resident on the data processing system. The data processing system receives sensor data from the film processing system. As described in greater detail below, the sensor data is representative of the colors and silver in the film at each discrete location, or pixel, of the film. The sensor data is processed by an image processing software to produce the digital image. The image processing software operates to compensate for the silver in the film. In one embodiment, the image processing software comprises software based on U.S. patent application Ser. No. 08/999,421, entitled Defect Channel Nulling, which is incorporated herein by reference. In this embodiment, any silver remaining in the film is treated as a defect and each individual pixel color record is compensated to remove the effect of the silver. Digitally compensating for the silver in the film instead of chemically removing the silver from the film substantially reduces or eliminates the production of hazardous chemical effluents that are generally produced during conventional film processing methods. Although the image processing software is described in terms of actual software, the image processing software may be embodied as hardware, such as an ASIC. The color records for each pixel form the digital image, which is then communicated to one or more output devices.

The output device may comprise any type or combination of suitable devices for displaying, storing, printing, transmitting or otherwise outputting the digital image. For example, as illustrated, the output device may comprise a monitor, a printer, a network system, a mass storage device, a computer system, or any other suitable output device. The network system may be any network system, such as the Internet, a local area network, and the like. The mass storage device may be a magnetic or optical storage device, such as a floppy drive, hard drive, removable hard drive, optical drive, CD-ROM drive, and the like. The computer system may be used to further process or enhance the digital image.

As described in greater detail below, the film processing system operates electronically scan the film to produce the sensor data. Light used to scan the film includes light within the visible portion of the electromagnetic spectrum. As illustrated, the film processing system comprises a transport system, a development system, and a scanning system. Although the improved digital film development system is illustrated with a development system, alternative embodiments of the improved digital film development system do not require the development system. For example, the film may have been preprocessed and not require the development process described below.

The transport system operates to dispense and move the film through the film processing system. In a preferred embodiment, the transport system comprises a leader transport system in which a leader is spliced to the film and a series of rollers advances the film through the film processing system, with care taken that the image surface of the film is not contacted. Similar transport systems are found in film products manufactured by, for example, Noritsu Koki Co. of Wakaysma, Japan, and are available to those in the art.

Figure 2A:
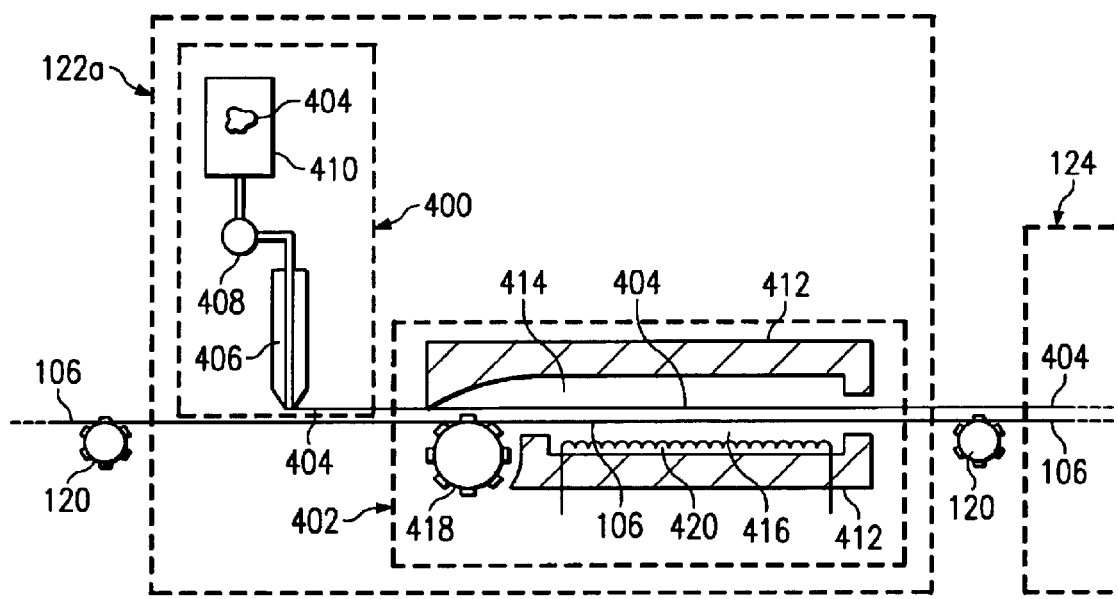
FIG. 2A is a schematic diagram illustrating a development system as shown in FIG. 1.
Figure 2B:
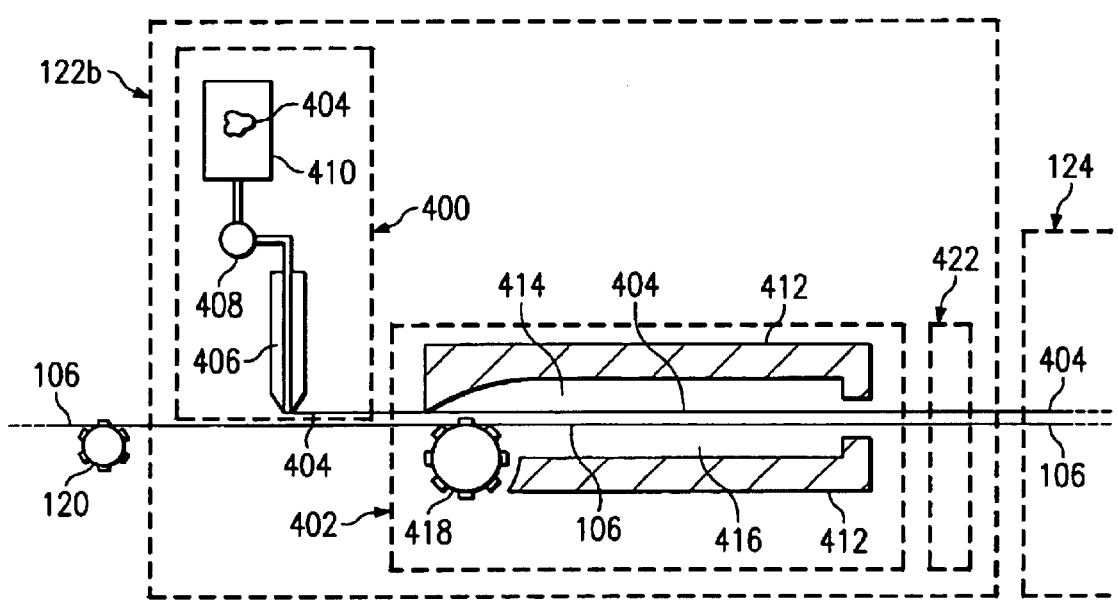
FIG. 2B is a schematic diagram illustrating another embodiment of the development system shown in FIG. 1.
Figures 1, 2B:
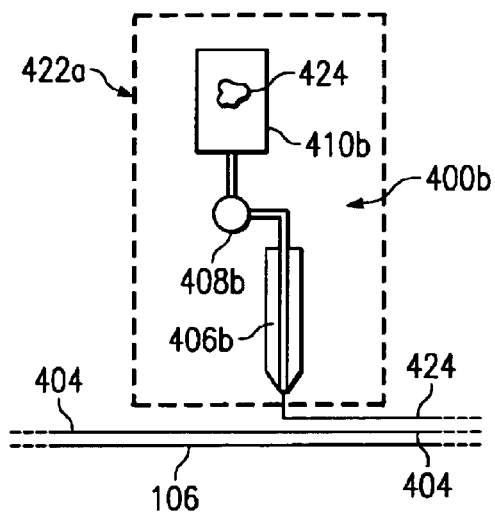
Figures 2, 2B:
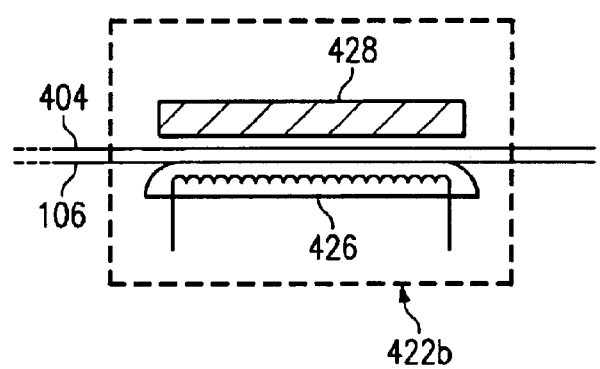

The development system operates to apply a processing solution to the film, as described in greater detail in FIG. 2.

The processing solution initiates development of the dye clouds and the metallic silver grains within the film. Additional processing solutions may also be applied to the film. For example, stop solutions, inhibitors, accelerators, bleach solutions, fixer solutions, and the like, may be applied to the film.

Figures 2, 2B, 3:
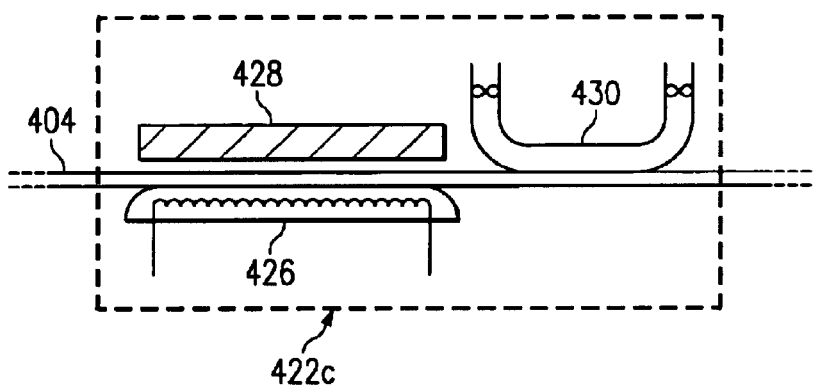
Figures 2, 2B, 3, 4:
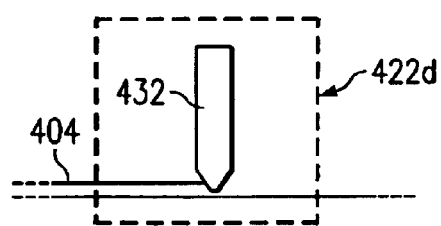
Figure 3:
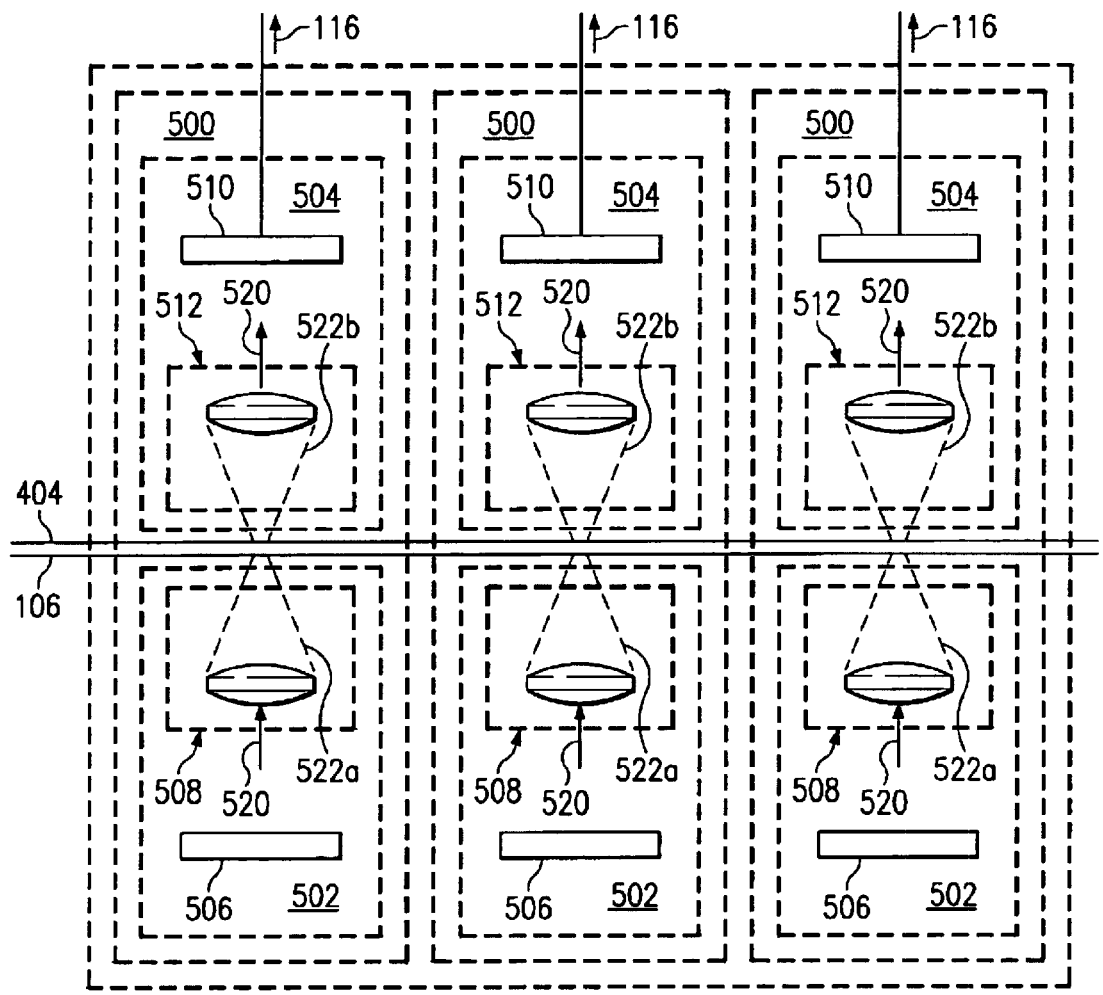

The scanning system scans the film through the processing solutions applied to the film, as described in greater detail in FIG. 3. In other words, the processing solutions are not removed from the film prior to the scanning process. In contrast, conventional film processing systems remove the processing solution and dry the film to create a conventional film negative prior to any digitization process. The scanning station scans the film using light within the visible portion of the electromagnetic spectrum. The visible light measures the intensity associated with the dye clouds as well as the silver within the film. In particular, one or more bands of visible light may be used to scan the film. For example, the film may be scanned using visible light within the red, green and/or blue portions of the electromagnetic radiation spectrum. In addition to scanning the film using visible light, the scanning system may also scan the film using light from other portions of the electromagnetic spectrum. For example, in one embodiment, infrared light is also used to scan the film. The infrared light scans the silver image by measuring the density of the metallic silver grains within the film. In contrast, conventional film processing systems remove substantially all the silver, both silver halide and metallic silver, from the film prior to any conventional scanning processes. Silver, whether metallic silver or silver halide crystals, in the film negative interferes with the transmission of light through the film negative and would be digitized along with the image. Any silver in the film negative would appear as defects in the resulting digital image.

In operation, exposed, but undeveloped film is fed into the transport system. The film is transported through the development system. The development system applies a processing solution to the film that develops the film. The transport system moves the film through the scanning system. The scanning system scans the film using light within at least one portion of the visible light portion of the electromagnetic spectrum. Light from the film is measured by the sensor system, which produces sensor data. The sensor data represents the dyes images plus the silver in the film at each pixel. The sensor data is communicated to data processing system. The data processing system processes the sensor data using image processing software to produce the digital image. The data processing system may also operate to enhance or otherwise modify the digital image. The data processing system communicates the digital image to the output device for viewing, storage, printing, communicating, or any combination of the above.

In a particular embodiment of the improved digital film development system, the improved digital film development system is adapted to a self service film processing system, such as a kiosk. The self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location.

In other embodiments, the improved digital film development system may be used for commercial film lab processing applications. Again, because there is no plumbing and the environmental impact of processing the film is substantially reduced or eliminated, the installation cost and the legal liability for operating such a film lab is reduced. The improved digital film development system can be adapted to any suitable application without departing from the scope and spirit of the invention.

FIG. 1A is a diagram of a film processing system 130 in accordance with one embodiment of the invention. The film processing system 130 is capable of providing film developing utility for a self service film processing system, for commercial film lab processing applications and the like. The film processing system 130 is self-contained, thus no plumbing is required for transporting chemicals or other materials to and/or from the film processing system 130.

The film processing system 130 includes a light-tight enclosure 132 having a plurality of process stations therein. Each one of the process stations is capable of carrying out one or more operation associated with developing a film provided in a roll format. The plurality of process stations define a process path of the film processing system 130. It is advantageous for each one of the film processing stations to be positioned and constructed to minimize a respective occupied volume of space. In this manner, the overall size of the enclosure 132 can be minimized, thus reducing space requirements for the film processing system 130.

The film processing system 130 includes a film magazine loading station 134. The film loading station is capable of receiving a film magazine 136 containing a roll of a film 138. The film magazine loading station 134 includes a film magazine port 140, a magazine carriage 142, an access panel 144 and a data acquisition device 146. It is contemplated herein that the film magazine 136 may be received from a person or from an automated film magazine delivery system.

One embodiment of the film magazine port 140 includes the access panel 144 being operable for being selectively moved between an open position and a closed position. For example, upon a valid authorization code such as a credit card authorization being received by an appropriate portion of the improved digital film development system as disclosed herein, the access panel 144 is moved from the closed position to the open position. With the access panel 144 in the open position, a user (e.g. a customer, employee, etc.) deposits the film magazine 136 through the film port 140 into the magazine carriage 142. The access panel 144 is maintained in the closed position, except when a roll of film is being deposited into the magazine carnage 142. Accordingly, the potential for vandalism to be facilitated through the film port 140 is reduced.

The data acquisition capture device 146 is capable of acquiring film attribute data from the film magazine 136. One embodiment of the data acquisition device 146 is a bar code reader capable of reading a bar code provided on the film magazine 136. Such film attribute data includes a film speed, a number of exposures, a date of manufacture of the film, film processing data, a film manufacturer and the like. If the film attribute data of the film 138 does not match that of expected data (e.g. the film is of an unknown manufacturer, has unknown film processing data, etc.) the film magazine is returned to the user or the mechanical magazine delivery system. As discussed below in greater detail, such film attribute data is further useful and/or necessary for various of the operations preformed by the film processing system 130.

The magazine carriage 142 includes a magazine receiver that facilitates holding the film magazine 136 during operations at the film magazine loading station 134, transporting the film magazine 136 to a tongue preparation station 148 and holding the film magazine 136 during operations at the tongue preparation station 148. The tongue preparation station 148 is an example of a film preparation station. It is contemplated herein that a film magazine transport apparatus may be implemented for transporting the magazine carriage 142 from the film magazine loading station 134 to the tongue preparation station 148. A linear transport device and a rotary transport device are examples of the film magazine transport apparatus.

The tongue preparation station 148 includes a tongue extraction device 150, a first film cutting device 152, a second film cutting device 154, driven feed rollers 156 and a film diverter 158. The tongue extraction device 150 is capable of extracting a tongue of film 138 from within the film magazine 136. The first film cutting device 152 and the second film cutting device 154 are capable of cutting a tongue and a tail, respectively, of film 138. It is contemplated herein that a combination film cutting device (not shown) capable of cutting both the tongue and the tail of the film 138 may replace the first film cutting device 152 and the second film cutting device 154.

Figure 1B:
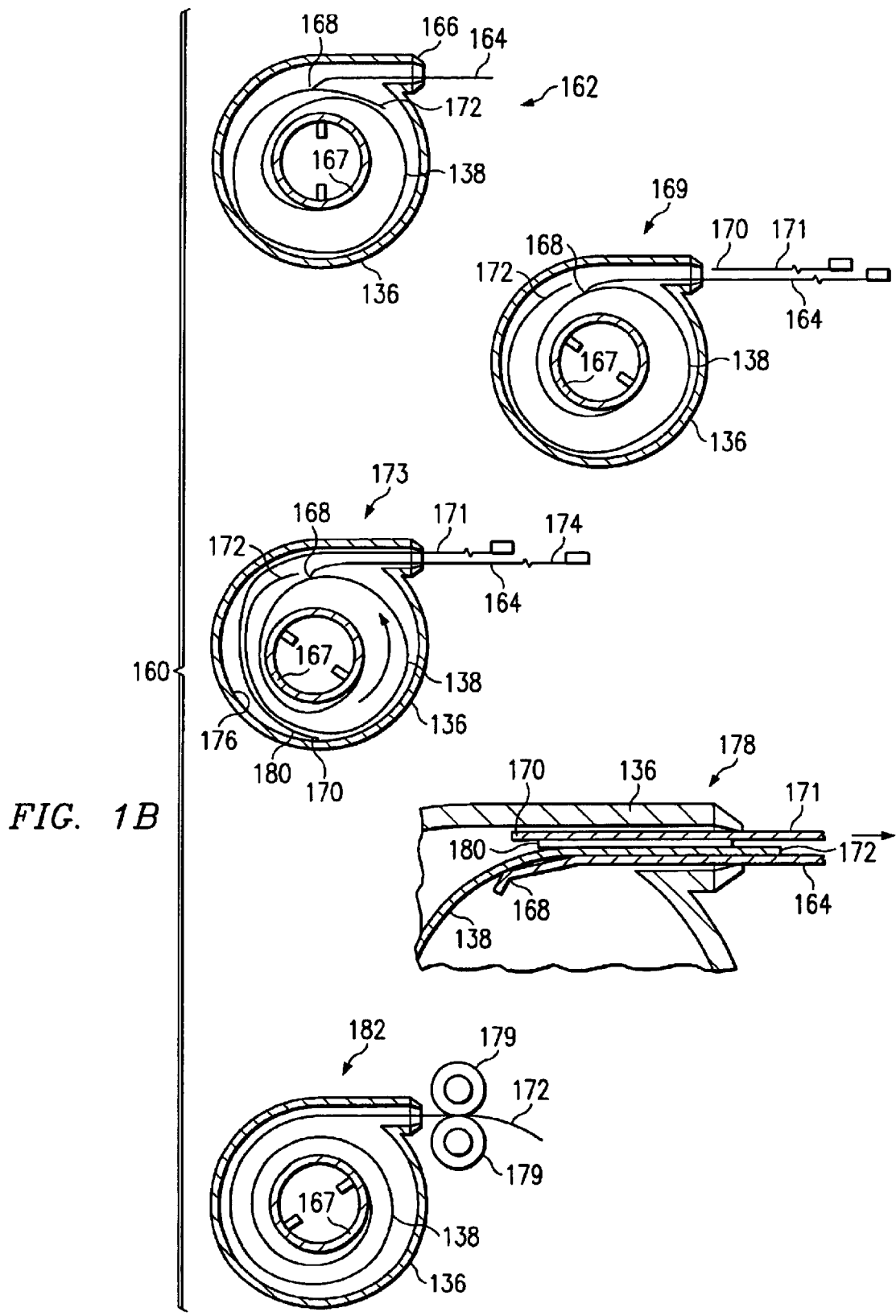
FIG. 1B is a diagrammatic view depicting a method for extracting a tongue of a film from a film magazine.

An embodiment of a tongue extraction method 160 is depicted in FIGS. 1B and 1C. An operation 162 is performed for inserting a tongue stripper 164 through a light-tight film window 166 of the film magazine 136. The tongue stripper 164 is configured such that a leading end 168 of the tongue stripper 164 is canted toward a spindle 167 of the film magazine 136 and into engagement with the film 138. In this manner, the leading end 168 of the tongue stripper 164 is in preloaded engagement with the film 138.

After performing the operation 162 for inserting the tongue stripper 164, an operation 169 is performed for enabling synchronous insertion of a leading end 170 of a tongue extractor 171 relative to the tongue 172 of the film 138. Enabling synchronous insertion is defined herein to mean that the leading end 170 of the tongue extractor 171 is inserted into the film magazine 136 at an essentially common velocity as a rotational velocity of the tongue 172 of the film 138 and at a prescribed relationship to the tongue 172 of the film 138. In this manner, the probability of extracting the tongue 172 is increased relative to conventional tongue extraction techniques.

One embodiment of the operation 169 for enabling synchronous insertion of the tongue extractor 171 includes a step 169A, FIG. 1C, for rotating the film 138 at a known and constant speed in a film rewind direction. In response to performing the step 169A for rotating the film 138 in the rewind direction, the film 138 is wrapped into a relatively tightly formed coil around the spindle 167 of the film magazine 136. As the tongue 172 of the film travels past the leading ende 168 of the tongue stripper 164, a 'tick' is produced as the leading end 168 of the tongue stripper 168 as it re-engages the film 138. A sequence of such ticks is an example of tongue extractor synchronizing data.

In response to rotating the film 138, a step 169B is performed for monitoring ticks generated by rotation of the film 138. It is contemplated herein that an acoustic, a mechanical or an otherwise suitable device may be used for monitoring such ticks. One embodiment of monitoring the acoustic tick includes associating the acoustic tick with an angular position of the spindle 167, such as via an angular encoder.

After monitoring the acoustic tick for one or more revolutions of the film 138, a step 169C is performed for determining insertion synchronization parameters for the tongue extractor 171. The objective of the synchronization parameters is to enable the tongue extractor 171 to be inserted into the film magazine 136 with minimal relative movement between the tongue extractor 171 and points of contact with the film 138 and with the leading end 170 of the tongue extractor 171 maintained at a desired position relative to the tongue 172 of the film 138. One example of determining insertion synchronization parameters includes determining an insertion synchronizing spindle speed and a tongue extractor insertion dwell. The insertion synchronizing spindle speed is a speed at which the spindle 167 is rotated for minimizing, and preferably eliminating, relative movement between the tongue extractor 171 and points of contact with the film 138 as the tongue extractor 171 is being inserted into the film magazine 136. The tongue extractor insertion dwell is a time delay, incremental spindle rotation, or other suitable dwell parameter that synchronizes initiation of a tongue extractor insertion operation with respect to the angular position of the spindle 167. Alternatively, initiation of the tongue insertion operation could be based on a correlation between the acoustic tick pattern (e.g. time between ticks) and tongue extractor insertion dwell.

After the tongue extractor synchronization parameters are determined, a step 169D is performed for implementing the tongue extraction synchronization parameters. Examples of implementing the tongue extraction synchronization parameters includes rotating the magazine spindle 167 at the synchronizing spindle velocity and verifying that the tongue extractor is at a prescribed position.

After the operation 169 is performed for enabling synchronous insertion of the tongue extractor 171, an operation 173 is performed for inserting the tongue extractor 171 into the film magazine 136 through the light-tight film window 166 of the film magazine 136. The tongue extractor 171 is positioned adjacent to an outside face 174 of the tongue stripper 164. Accordingly, the tongue extractor 171 follows an interior surface 176 of the film magazine 136 as it is inserted into the film magazine 136.

One embodiment of the operation 173 for inserting the tongue extractor 171 into the film magazine 136 includes synchronously decelerating the spindle 167 and the tongue extractor 171 for achieving respective stopped positions. In this manner, relative movement between the tongue extractor 171 and points of contact with the film 138 is minimized or preferably eliminated. The stopped position of the tongue extractor 171 is at least partially defined by a prescribed insertion distance of the tongue extractor 171.

After performing the operation 173 for inserting the tongue extractor 171 into the film magazine 136, an operation 178 is performed for withdrawing the tongue extractor 171 from the film magazine 136. One embodiment of the operation 178 for withdrawing the tongue extractor 171 from the film magazine 136 includes synchronously accelerating the spindle 167 in a direction opposite the rewind direction and accelerating the tongue extractor 171 in a withdrawal direction. In this manner, relative movement between the tongue extractor 171 and points of contact with the film 138 is minimized or preferably eliminated. As the tongue extractor 171 is withdrawn from the film magazine 136, the tongue 172 is drawn over the film stripper 164 and is carried out of the light-tight film window 166. Another embodiment of the operation 178 for withdrawing the tongue extractor 171 into the film magazine 136 includes allowing the film 138 to free-wheel while the tongue extractor 171 is being withdrawn.

The tongue extractor 171 includes a friction pad 180, FIG. 1B, attached to the tongue extractor 171. The friction pad 180 is positioned such it is capable of engaging a surface of the film 138. Furthermore, the tongue extractor 178 and the film stripper 164 are configured for exerting a nominal clamping force on the tongue 172. Accordingly, the friction pad 180 remains engaged on a mating surface of the film 138 as the tongue extractor 171 is withdrawn from the film magazine 136.

In response to withdrawing the tongue extractor 171 from the film magazine 136, an operation 181, FIG. 1C, is performed for determining if the tongue 172 of the film 138 was successfully withdrawn from the film magazine 136. In response to the tongue 172 of the film 138 being successfully withdrawn, an operation 182 is performed for removing the tongue stripper 164 from the film magazine 136. In response to the tongue 172 of the film 138 not being successfully withdrawn, the method returns to the operation 169 for enabling synchronous insertion of a leading edge 170 of a tongue extractor 171 relative to the tongue 172 of the film 138.

Referring back to FIG. 1A, tongue of the film 138 is extracted in a manner in which the tongue it positioned between the driven feed rollers 156. In this manner, driven feed rollers 156 are capable of pulling the film 138 from the film magazine 136. As the film 138 is being pulled from the film magazine 136, the tongue (i.e. the leading end) of the film 138 is routed through a film diverter 158.

The film diverter is capable of being moved between three positions. The film divert 158 is movable to a tongue trimming position for enabling the tongue of the film to be trimmed by the first film cutting device 152. The film divert 158 is movable to a film reverser position for enabling the film to be routed through a film inspection station 190 and to a film reversing station 192. The film diverter 158 is movable to a bypass position for routing the film 138 to a splicing station 193.

The film inspection station 190 is capable of detecting imperfections and defects in the film 138. Examples of imperfections and defects include scratches, tears, cuts, missing perforations and the like. If the film 138 is found to have significant imperfections of defects, the film 138 can be rewound into the film magazine 136. A CMOS linear array in conjunction with low angle lighting on a surface of the film 138 is an example of an arrangement for detecting surface scratches, cuts and tears. A photo diode aligned with an LED is an example of an arrangement for detecting missing perforations. In an instance where the film 138 is found to be unsuitable for processing in the film processing system 130, the film processing system 130 is capable of rewinding the film 138 in the magazine 136 and facilitating disposition of the film 138. Examples of facilitating disposition of the film 138 include returning the film magazine 136 to an corresponding user, directing the film magazine 136 to a storage bin and returning the film magazine 136 to an corresponding magazine delivery system.

The film 138 passes through the inspection station 190 and is received in a film reverser 194 at the film reversing station 192. The film reverser 194 facilitates reversing the orientation of the film 138 such that a tail end of the film 138 becomes a leading end 195 of the film 138 and the tongue of the film 138 becomes a trailing end 196 of the film 138. Accordingly, the orientation of the film 138 is reversed as the film 138 continues from the reversing station 192 through the remaining stations of the film processing system 130.

The tail end (leading end 195) of the film 138 was originally attached to a spindle of the film magazine 136. Accordingly, the tail end (leading end 195) of the film 138 is unexposed. As discussed below in greater detail, it is advantageous to reverse the direction of the film 138 such that the calibration exposure is positioned at the leading end 195 of the film 138.

Figure 1D:
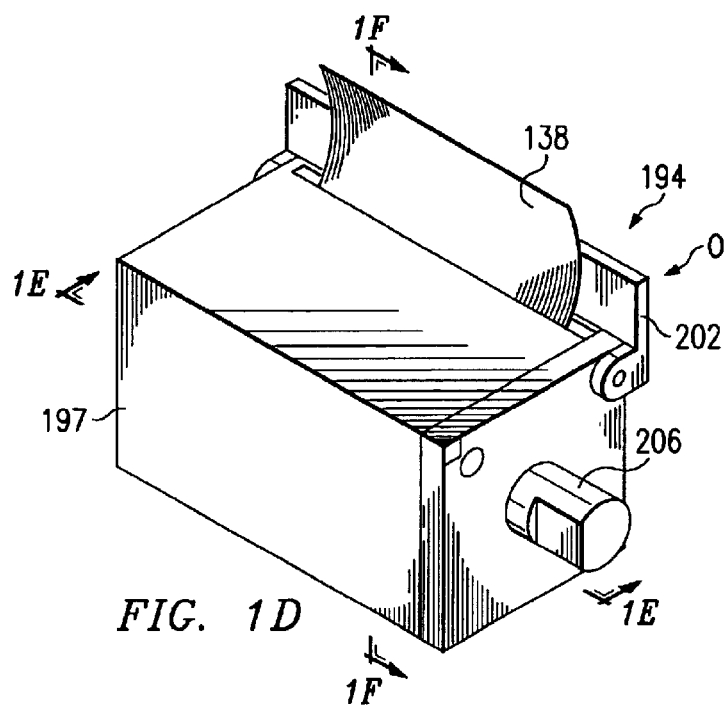
FIG. 1D is a perspective view depicting a film reverser according to one embodiment of the invention.
Figure 1E:
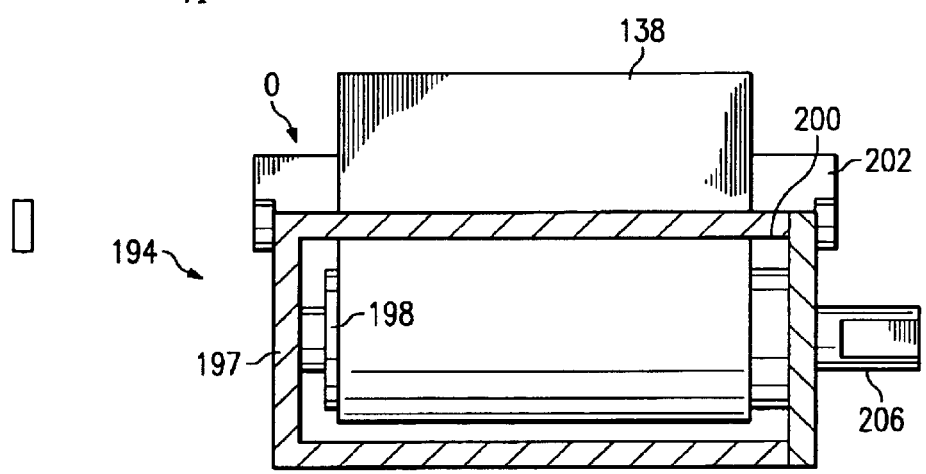
FIG. 1E is a cross-sectional view taken along a line 1E—1E in FIG. 1D.
Figure 1F:
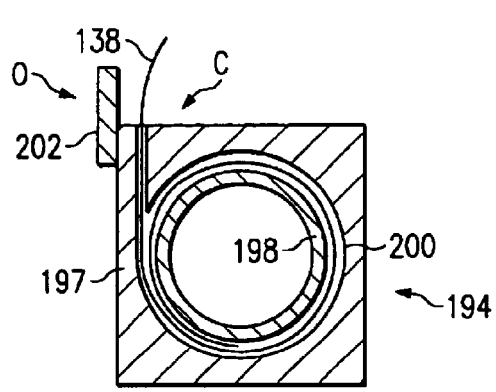
FIG. 1F is a cross-sectional view taken along a line 1F—1F in FIG. 1D.

An embodiment of the film reverser 194 is depicted in FIGS. 1D through 1F. The film reverser 194 includes a body 197, a spindle 198 mounted in a cavity 200 of the body 197, and a door 202 for covering a film passage 204. The spindle 198 is rotatably mounted on the body 197 for being rotated about a longitudinal axis of the cavity 200. The spindle 198 includes a shaft 206 for enabling the spindle 198 to be rotated by a suitable drive device (e.g. an electric motor). The film passage 204 extends from an exterior surface of the body 197 to the cavity 200. The door 202 is movable, such as by a solenoid, between an open position O and a closed position C with respect to the film passage 204. When in the closed position C, light is effectively precluded from entering the body 197 through the film passage 204.

Referring to FIGS. 1A and 1D through 1F, the tongue of the film 138 is fed, such as by the driven feed rollers 156, into the cavity 200 through the film passage 204. The film 138 makes an initial wrap around the spindle 198. The spindle 198 is being rotated as the film 138 is being fed into the cavity 200. In one embodiment of rotating the spindle 198, the spindle 198 is rotated at a speed providing a higher spindle surface velocity that the velocity at which the film 138 is being fed into the reverser 194. Accordingly, the speed differential between the spindle 194 and the film 138 acts to wind the film 138 into a relatively tight roll against the spindle 198.

Referring back to FIG. 1A, as the driven feed rollers 156 pull the film 138 from the film magazine 136 and the film is fed into the reverser 194, a total length of the film 138 that has been pulled from the film magazine 136 is monitored. Examples of monitoring the total length of film 138 include computing the total length based on a rotational angle of one or both of the driven feed rollers 156, based on a number of electrical pulses set to a stepper motor or based on a total number of counted perforations. When excessive withdrawal force is encountered as the film 138 is being pulled from the film magazine 136, the length of film 138 that has been withdrawn from the film magazine 136 is compared to an expected length of film 138. One technique for determining the expected length of the film 138 involves calculating the expected length of the film 138 based at least partially on film attribute data (e.g. the number of exposures) captured by the data acquisition capture device 146 at the film magazine loading station 134. Techniques for determining withdrawal force include using a force transducer to measure a force required to hold the magazine carriage 142 at a given position, using a displacement transducer for determining movement of the magazine carriage 142 and measuring a required electrical of a motor driving the feed rollers 156.

During the operation of pulling the film 138 from the film magazine 136, the feed rollers 156 continue to drive until a prescribed condition is met if the withdrawn length is within limits of the expected length when excessive withdrawal force is detected. Examples of the prescribed condition resulting in the film 138 being cut include the "paster tape" that anchors the tail end of the film 138 to the spindle of the film magazine 136 being detected by a sensing device, a prescribed current of a drive motor being exceeded or a surface of the film magazine 136 is detected by a suitable sensing device. When such prescribed condition is met, the tail end of the film 138 is cut by the second film cutting device 154, thus freeing the film 138 from the film magazine 136.

The feeding operation is stopped prior to the tail of the film 180 passing through the driven feed rollers 156. Accordingly, the tail of the film 138 remains positioned between the driven feed rollers 156. After the tail of the film 138 is cut from the spindle of the film magazine 136, the film magazine 136 is deposited into a waste receptacle 208.

The film processing system 130 is capable of rejecting the film 138 and returning it to the user or the film delivery system if the withdrawn length is not within the limits expected when excessive withdrawal force is detected. In one embodiment of a technique for rejecting and returning the film 138, the film 138 is rewound into the film magazine 136 by a suitable drive system (not shown) and then returned to the user, returned to the film delivery system or deposited in a storage bin. An example of a suitable drive system is one that is capable of driving the spindle of the film magazine 136.

Once the film 138 is fully wound into the film reverser 194, the film diverter 158 is moved to the bypass position for routing the film 138 from the film reversing station 192 to the splicing station 193. The film 138 is then fed from the film reverser 194 to the splicing station 193 for being spliced to a threaded leader 210.

At a leader supply station 212, the threaded leader 210 is cut by a leader cutting device 214 prior to the leading end 195 of the film 138 reaching the splicing station 193. In response to cutting the threaded leader 210 from a leader supply roll 214, a trailing end 216 of the threaded leader 210 is defined. The trailing end 216 of the threaded leader 210 is positioned at a splicing device 218 of the splicing station 193. A heated splicing head is an example of the splicing device 218. A supply of thermal splicing tape 220 is provided to the splicing device 218.

When the leading end 195 of the film 138 is positioned at the splicing device 218, the splicing device 218 is activated for facilitating splicing of the leading end 195 of the film 138 to the trailing end 216 of the threaded leader 210. Examples of techniques for positioning of the leading end 195 of the film 138 at the splicing station include using a sensor to sense the leading end 195 and feeding the leading end 195 of the film 138 a prescribed feed distance from the reversing station 192. It is contemplated herein that the leader supply roll 214 and leader material attached thereto may need to be rewound partially, such as via leader feed rollers 222, for enabling the leading end 195 of the film 138 to be positioned at the splicing device 218.

The use of the threaded leader 210 as disclosed herein advantageously permits the film processing system 130 to sequentially, but not necessarily continually process multiple rolls of film. The threaded leader 210 provides a simple yet effective means of threading the film 138 from the reversing station 192 through the remaining stations of the film processing system 130.

As depicted in FIG. 1A, when the leading edge 195 of the film 138 reaches the reversing station 192, a previously processed film 224 is a considerable distance ahead of the film 138 along the process path. For example, in the case of a self service film processing system, film processed for a first customer will be completed before beginning the processing of film for a second customer. Implementation of the threaded leader 210 provides continuity along the process path between various rolls of film. It is contemplated herein that the leader also facilitates processing of an initial roll of film upon startup of the film processing system 130.

The film processing system 130 includes a cleaning station 226. One embodiment of the cleaning station 226 includes a first particle transfer roller positioned for being engaged by a first surface of the film 138 and a second particle transfer roller positioned for being engaged by a second surface of the film 138. The cleaning station 226 is preferably positioned between the splicing station 193 and a calibration exposure station 228. However, it is contemplated herein that the cleaning station 226 may be positioned after the calibration exposure station 228. It is further contemplated herein that a first portion of the cleaning station 226 (e.g. the first particle transfer roller) may be positioned before the calibration exposure station 228 and a second portion of the cleaning station 226 (e.g. the second particle transfer roller) may be after the calibration exposure station 228. Preferably, the particle transfer roller that is engaged by the side of the film 138 that receiving a calibration exposure is positioned before the calibration exposure station 228.

The calibration exposure station 228 facilitates the calibration exposure being made on an unexposed portion of the film 138. As discussed above, film 138 is reversed such that an unexposed portion of the film 138 is provided at the leading end 195 of the film 138. Accordingly, information provided by the calibration exposure is capable of being determined prior to any of the frame exposures of the film 138 being digitally processed as disclosed herein.

Providing the calibration exposure at the leading end 195 rather than the trailing end 196 of the film 138 advantageously permits images from the film 138 to be processed by a data processing system, such as the data processing system of the improved digital film processing system disclosed herein, in parallel with the film 138 being developed. For example, after a first frame exposure is developed, processing of an image associated with the first frame exposure is performed by the data processing system of the improved digital film processing system disclosed herein while a second frame exposure is developed by the film processing system 130. Such parallel processing reduces an overall processing time for a roll of film and the time required for displaying a first image and each subsequent image for a roll of film.

A buffer station 230 provides a variable length of the film 138 and/or threaded leader 210 for allowing one portion of the film 138 to be maintained in a moving state while another portion of the film 138, the threaded leader 210 or both is at an idle state. For example, process operations associated with an applicator station 232, a development station 234 and a scanning station 236 are preferably performed on a first portion of the film 138 while the film 138 is moving at a constant speed. While such continuous process operations are performed at the applicator station 232, the development station 234 and the scanning station 236, intermittent operations are being performed on second portion of the film 138 and/or the threaded leader at the splicing station 193 and at the calibration exposure station 228. These intermittent operations require the film 138 to be at an idle state for a period of time. The variable length of film 138 and/or threaded leader 210 provided by the buffer station 230 permits such continuous and intermittent process operations to co-exist in the film processing system 130.

At the applicator station 232, a processing solution is applied to the film 138. The development station 234 operates to give the film 138 sufficient time to develop prior to developed images being scanned at the scanning station 236. Various aspects of the applicator station 232 and the development station 234 are disclosed in greater detail in reference to FIG. 2. Various aspects of the scanning station 236 are disclosed in greater detail in reference to FIGS. 3 and 4.

A web take-up station 237 includes a driven-reel for having processed film and attached leaders wound thereon.

The magazine loading station 134, the tongue extraction station 148, the reversing station 192, the splicing station 193, the leader supply station 212 and the web take-up station 237 comprise a transport system in accordance with one embodiment of the invention. Such a transport system is particularly suited for a developing system intended for use in a self service film processing system. Specifically, the construction and utility of the magazine loading station 134, the tongue extraction station 148, the reversing station 192, the splicing station 193, the leader supply station 212 and the web take-up station 237 are well-suited for a self service film processing system. However, it is contemplated herein that such a transport system may also be useful in other types of film processing system besides a self service film processing system.

A method 240 for processing film in a developing system, such as the film processing system 130 and in accordance with the disclosures herein is depicted in FIG. 1G. In the method 240, an operation 242 is performed for receiving a film magazine having a roll of film therein. One embodiment of the method 242 for receiving the film magazine includes receiving an authorization such as a customer credit card authorization of an employee identification authorization and subsequently enabling one or more film magazines to be deposited in an appropriate apparatus of the film developing system.

In response to receiving the film magazine, an operation 244 is performed for determining one or more process parameters associated with the film. One embodiment of a technique for determining the one or more process parameters is reading a barcode provided by the film manufacturer on each film magazine. It is contemplated herein that the film magazine and film therein may be returned to an operator of the developing system if the one or more film processing parameters indicates that the film is not capable of being processed by the developing system.

After the one or more process parameters are determined and the film is determined to be processible by the developing system, an operation 246 is performed for extracting a tongue of the film from within the film magazine. A preferred embodiment of the operation 246 for extracting the tongue of the film from within the film magazine is disclosed above in reference to FIGS. 1B and 1C. After the tongue of the film is extracted from the magazine, an operation 248 is performed for reversing a direction of the film such that an end of the film adjacent to a spindle of the film magazine is a leading end of the film along a process path of the developing system.

An operation 250 for inspecting the film is performed in parallel with the operation 248 for reversing the film. The film is inspected for defects such as tears, cuts, missing perforations, etc. It is contemplated herein that in other embodiments of the operation for inspecting the film, the film is inspected before the operation for revering the film is performed or after the operation for inspecting the film is performed.

In response to the operation 250 for inspecting the film finding the film to not be in a suitable condition for further processing, an operation 252 is performed for rewinding the film in the film magazine and an operation 254 is performed for dispensing the film magazine from the developing system. It is contemplated herein that the operation 254 for dispensing the film magazine from the developing system includes returning the film to a customer/operator, depositing the film in a bin or the like.

In response to the operation 250 for inspecting the film finding the film to be in a suitable condition for further processing, an operation 256 is performed for cutting a tail end of the film free from the spindle of the film magazine. After the tail end of the film is cut free from the spindle, the tail end of the film becomes a leading end of the film and an operation 258 is performed for splicing the leading end of the film to a trailing end of a threaded leader. The threaded leader is threaded through at least a portion of the process stations of the developing system.

After splicing the leading end of the film to the trailing end of the threaded leader, an operation 260 is performed for cleaning the film. Examples of techniques for cleaning the film include transporting each side of the film over respective particle transfer rollers, exposing each side of the film to a stream of air, discharging static energy from surfaces of the film an a combination of such techniques. After cleaning the film or in parallel with cleaning the film, an operation 262 is performed for creating a calibration exposure on an unexposed portion of the film. One embodiment of creating the calibration exposure includes creating the calibration exposure on the leading end of the film.

After creating the calibration exposure, an operation 264 is performed for applying a processing solution on a surface of the film over a plurality of exposed images in a photosensitive media on the first surface of the film. After applying the processing solution over at least a portion of the exposed images, an operation 266 is performed for enabling development of each one of the images having the processing solution applied thereto. In response to applying the processing solution and performing the operation for enabling development, an exposed image becomes a developed image. Various aspects of applying the processing solution (i.e. the operation for applying the processing solution) and of developing exposed images (i.e. the operation for developing the exposed images) are disclosed in greater detail in reference to FIG. 2.

In parallel with developing each one of the exposed images or after all of the developed images are created, an operation 268 is performed for scanning each one of the developed images. Various aspects of the scanning the developed images (i.e. the operation for scanning each one of the developed images) are disclosed in greater detail in reference to FIGS. 3 and 4.

In response to the trailing end of the film reaching the splicing station, an operation 269 is performed for splicing the trailing end of the film to a leading end of a new section of leader. Accordingly, as the film continues along the process path through the developing system, the leader is threaded along the process path behind the film. In this manner, the leader facilitates threading of a subsequent roll of film through the process stations positioned along the process path after the splicing station.

Figure 1H:
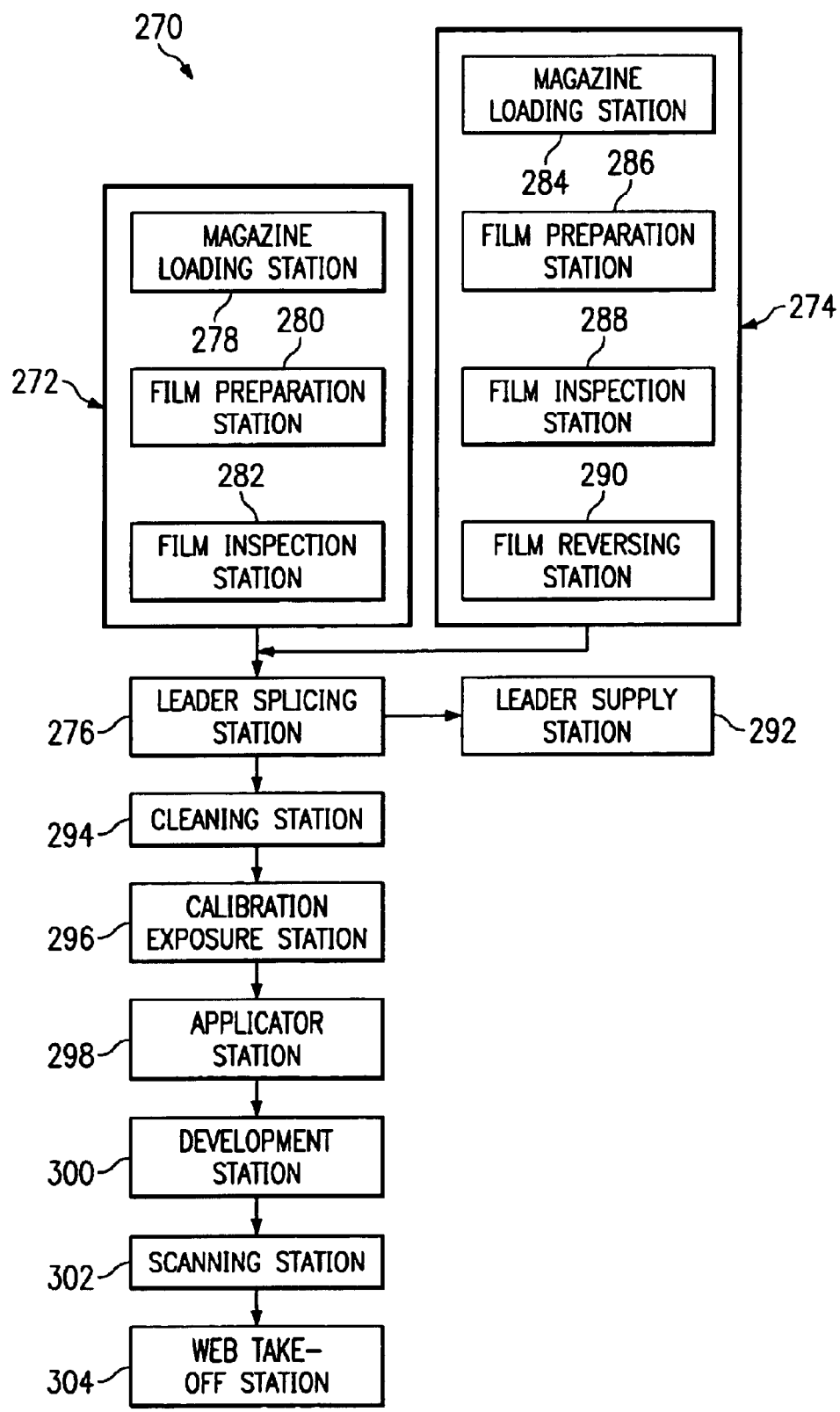
FIG. 1H is a block diagram view depicting a multiple film format developing system operable in a self service film processing system in accordance with one embodiment of the invention.
Figure 11:
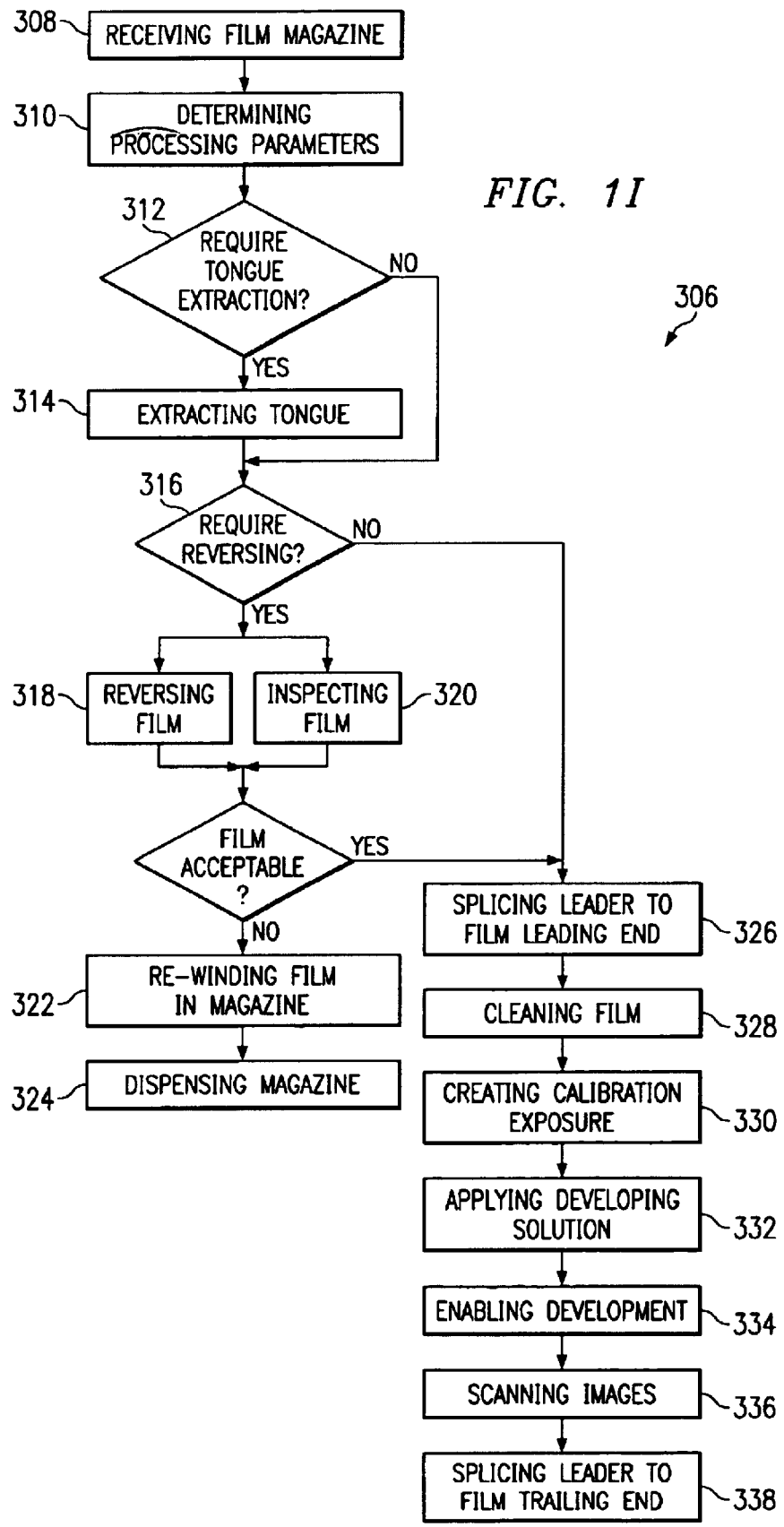

FIG. 1H is a diagram of a multi-film format developing system 270 in accordance with another embodiment of the invention. The developing system 270 is capable of providing film developing utility for a self service film processing system, for commercial film lab processing applications and the like. The developing system 270 is further capable of providing film developing functionality for at least two different types of film formats. APS and 135 are examples of two different types of film formats. The developing system 270 is self-contained, thus no plumbing is required for transporting chemicals or other materials to and/or from the developing system 270.

The developing system 270 includes a first film format delivery apparatus 272 and a second film format delivery apparatus 274. The first film format delivery apparatus 272 and the second film format delivery apparatus are capable of delivering a leading end of a respective roll of a film to a leader splicing station 276 of the developing system 270. The first film format delivery apparatus 272 is capable of delivering film associated with a first film format (e.g. APS film format) to the leader splicing station 276. The second film format delivery apparatus 274 is capable of delivering film associated with a second film format (e.g. 135 film format) to the leader splicing station 276.

One embodiment of the first film format delivery apparatus 272 includes a film magazine loading station 278, a film preparation station 280 and a film inspection station 282. The film magazine loading station 278 of the first film format delivery system 272 is capable of receiving a film magazine associated with the first film format. The first film format preparation station 280 of the first film format delivery system 272 is capable of preparing film (e.g. trimming a tongue) associated with the first format for being transported through the developing system 270. The first film format inspection station 282 of the first film format delivery system 272 is capable of inspecting film associated with the first film format.

One embodiment of the second film format delivery apparatus 274 includes a film magazine loading station 284, a film preparation station 286, a film inspection station 288 and a film reversing station 290. The film magazine loading station 284 of the second film format delivery apparatus 274 is capable of receiving a film magazine associated with the second film format. The film preparation station 286 of the second film format delivery apparatus 274 is capable of preparing film (e.g. trimming a tongue) associated with the second format for being transported through the developing system 270. The film inspection station 288 of the second film format delivery apparatus 274 is capable of inspecting film associated with the second film format. The film reversing station 290 of the second film format delivery apparatus 274 is capable of reversing film associated with the second film format.

Film is capable of being separately routed to the leader splicing station 276 from each one of the film delivery apparatuses of the developing system 270. The leader splicing station 276 receives a supply of leader material from a leader supply station 292. Depending on the condition, the leader supply station 292 provides a trailing end of a leader for being spliced to a leading end of film or a leading end of a leader for being spliced with a trailing end of film. Accordingly, continuity is maintained along a process path of the developing system 270 between various rolls of film.

A cleaning station 294 is located in a downstream position from the leader splicing station 276 along the process path of the developing station 270. The cleaning station 294 is capable of cleaning at least one side of film as film travels through the cleaning station 294. A calibration exposure station 296 is located in a downstream position from the cleaning station 294 along the process path of the developing station 270. The calibration exposure station 296 is capable of generating a calibration exposure in a photographic layer of film as such film passes through the calibration exposure station 296.

An applicator station 298 is located in a downstream position from the calibration exposure station 296 along the process path of the developing station 270. The applicator station 298 is capable of applying a layer of processing solution to at least one side of film as such film travels through the applicator station 298. A development station 300 is located in a downstream position from the applicator station 298 along the process path of the development system 270. The development station 300 is capable of enabling development of exposed images in the photographic layer of film as such film passes through the development station 300. A scanning station 302 is located in a downstream position from the development station 300 along the process path of the developing station 270. The scanning station 302 is capable of scanning developed images in the photographic layer of film as such film passes through the scanning station 302. A web take-up station 304 includes a driven-reel for having processed film and attached leaders wound thereon.

The first film format delivery apparatus 272, the second film format delivery apparatus 274, the splicing station 276, the leader supply station 292 and the web take-up station 304 comprise a transport system in accordance with one embodiment of the invention. Such a transport system is particularly suited for a developing system intended for use in a self service film processing system capable of processing at least two types of film formats. However, it is contemplated herein that such a transport system may also be useful in other types of film processing system besides a self service film processing system.

FIG. 1I depicts a method 306 for processing film in a multi-film format developing system, such as the developing system 270 depicted in FIG. 1H, and in accordance with the disclosures herein. In the method 306, an operation 308 is performed for receiving a film magazine having a roll of film therein. One embodiment of the method 308 for receiving the film magazine includes receiving an authorization such as a customer credit card authorization of an employee identification authorization and subsequently enabling one or more film magazines to be deposited in an appropriate apparatus of the film developing system.

In response to receiving the film magazine, an operation 310 is performed for determining one or more process parameters associated with the film. One embodiment of a technique for determining the one or more process parameters is reading a barcode provided by the film manufacturer on each film magazine. It is contemplated herein that the film magazine and film therein may be returned to an operator of the developing system if the one or more of the film processing parameters indicates that the film is not capable of being processed by the developing system.

After the one or more process parameters are determined and the film is determined to be processible by the developing system, an operation 312 is performed for determining if a tongue of the film requires extraction from the film magazine. The one or more process parameters are used for determining whether tongue of the film requires extraction from the film magazine. In response to determining that the film of the tongue needs extraction from the film magazine (e.g. 135 film format), an operation 314 is performed for extracting the tongue of the film from within the film magazine. A preferred embodiment of the operation 314 for extracting the tongue of the film from within the film magazine is disclosed above in reference to FIGS. 1B and 1C.

After the tongue of the film is extracted from the magazine or in response to determining that the film of the tongue does not need extraction from the film magazine (e.g. APS film format), an operation 316 is performed for determining if the film requires reversing. As disclosed above in reference to FIGS. 1A and 1D, film reversing is associated with placement of a calibration exposure. In response to determining that film reversing is required, an operation 318 is performed for reversing a direction of the film such that an end of the film adjacent to a spindle of the film magazine becomes a leading end of the film along a process path of the developing system.

An operation 320 for inspecting the film is performed in parallel with the operation 318 for reversing the film. The film is inspected for defects such as tears, cuts, missing perforations, etc. It is contemplated herein that in other embodiments of the operation for inspecting the film, the film is inspected before the operation for revering the film is performed or after the operation for inspecting the film is performed.

In response to the operation 320 for inspecting the film finding the film to not be in a suitable condition for further processing, an operation 322 is performed for rewinding the film in the magazine and an operation 324 is performed for dispensing the film magazine from the developing system. It is contemplated herein that the operation 324 for dispensing the film magazine from the developing system includes returning the film to a customer/operator, depositing the film in a bin or the like.

In response to the operation 320 for inspecting the film finding the film to be in a suitable condition for further processing or in response to reversing of the film not being required, an operation 326 is performed for splicing the leading end of the film to a trailing end of a threaded leader at a splicing station. The threaded leader is threaded through at least a portion of the process stations of the developing system. It is contemplated herein that other operations may be performed between the operation 316 for determining if reversing is required and the operation 326 for splicing the film. Examples of such other operations include an inspection operation if film reversing is not required, a cutting operation for cutting the film from a spindle of the film magazine, etc.

After splicing the leading end of the film to the trailing end of the threaded leader, an operation 328 is performed for cleaning the film. Examples of techniques for cleaning the film include transporting each side of the film over respective particle transfer rollers, exposing each side of the film to a stream of air, discharging static energy from surfaces of the film an a combination of such techniques. After cleaning the film or in parallel with cleaning the film, an operation 330 is performed for creating a calibration exposure on an unexposed portion of the film. One embodiment of creating the calibration exposure includes creating the calibration exposure on the leading end of the film.

After creating the calibration exposure, an operation 332 is performed for applying a processing solution on a surface of the film over a plurality of exposed images in a photosensitive media on the first surface of the film. After applying the processing solution over at least a portion of the exposed images, an operation 334 is performed for enabling development of each one of the images having the processing solution applied thereto. In response to applying the processing solution and performing the operation for enabling development, an exposed image becomes a developed image. Various aspects of applying the processing solution (i.e. the operation for applying the processing solution) and of developing exposed images (i.e. the operation for developing the exposed images) are disclosed in greater detail in reference to FIG. 2.

In parallel with developing each one of the exposed images or after all of the developed images are created, an operation 336 is performed for scanning each one of the developed images. Various aspects of the scanning the developed images (i.e. the operation for scanning each one of the developed images) are disclosed in greater detail in reference to FIGS. 3 and 4.

In response to the trailing end of the film reaching the splicing, an operation 338 is performed for splicing the trailing end of the film to a leading end of a new section of leader. Accordingly, as the film continues along the process path through the developing system, the leader is threaded along the process path behind the film. In this manner, the leader facilitates threading of a subsequent roll of film through the process stations positioned along the process path after the splicing station.

Figure 1J:
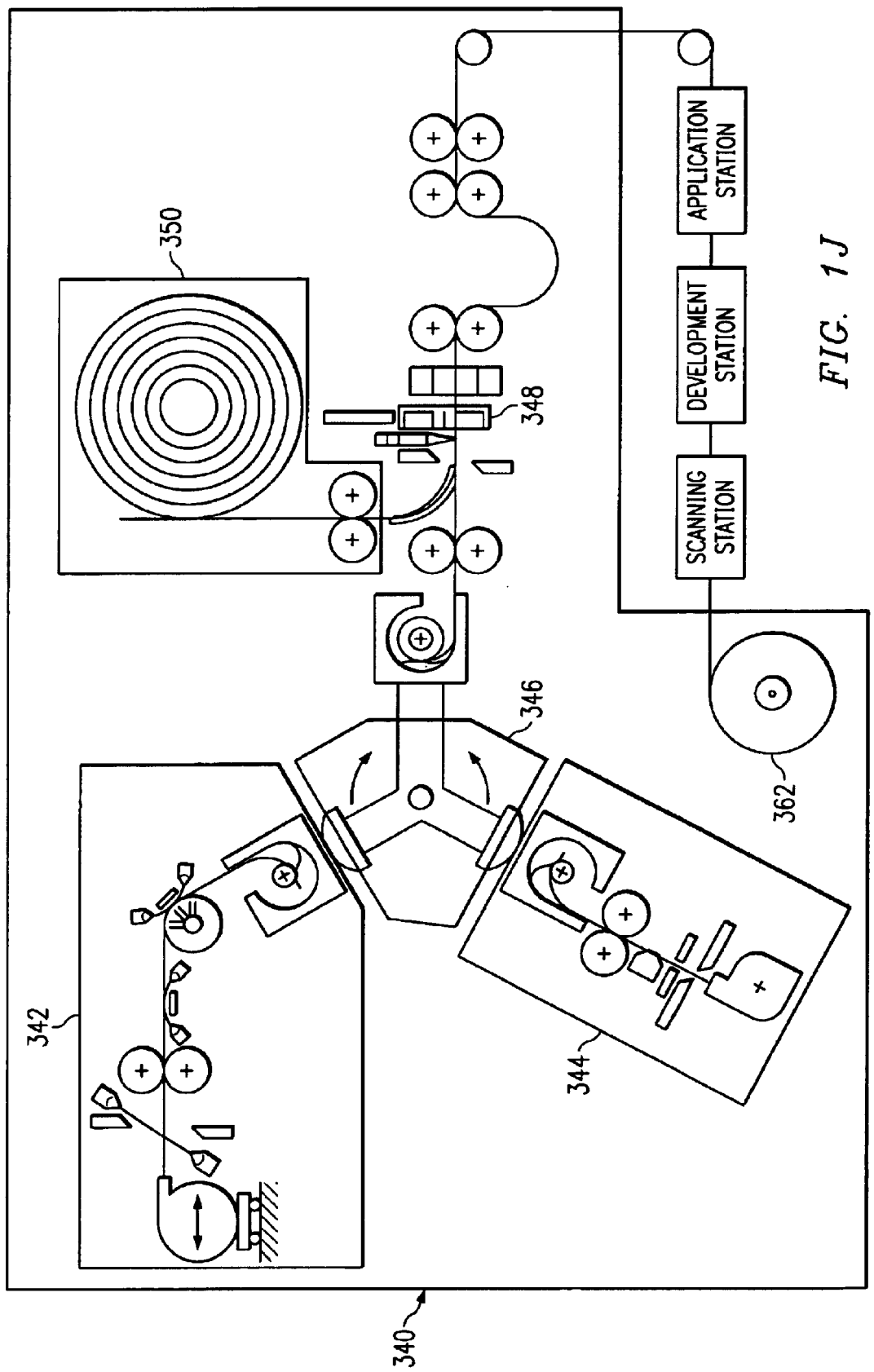
FIG. 1J is a diagram of a rotary type transport system according to one embodiment of the invention.

FIG. 1J is a diagram of a rotary type transport system 340 in accordance with another embodiment of the invention. The transport system 340 includes a first film format delivery apparatus 342, a second film format delivery apparatus 344, a rotary film magazine transport apparatus 346, a film splicing station 348, a leader supply station 350 and a web take-up station 352. The first film format delivery apparatus 342 and the second film format delivery apparatus 344 each include one or more film process stations. Examples of film process stations include a film magazine loading station, a tongue extraction station, a reversing station and an inspection station.

The first film format delivery apparatus 342 and the second film format delivery apparatus 344 are capable of delivering a leading end of a roll of a film to a leader splicing station 348 via the rotary film magazine transport apparatus 346 The first film format delivery apparatus 342 and the second film format delivery apparatus 344 are operationally and/or structurally attached to the rotary film magazine transport apparatus 346. The rotary film magazine transport apparatus 346 is capable of being rotated for delivering film from the first film format delivery apparatus 342 and the second film format delivery apparatus 344 to the splicing station 348.

FIG. 2A illustrates one embodiment of a development system 122. In this embodiment, a development system 122a comprises an applicator station 400 and a development station 402. The applicator station 400 operates to apply a relatively uniform coating of a processing solution 404 to the film. In one embodiment, the processing solution 404 comprises a color developer solution, such as Flexicolor Developer for Process C-41 available from the Eastman Kodak Company. In other embodiments, the processing solution 404 comprises other suitable solutions. For example, the processing solution 404 may comprise a monobath solution that acts as a developer and stop solution.

The applicator station 400 comprises an applicator 406, a fluid delivery system 408, and a reservoir 410. The applicator 406 operates to coat the film 106 with the processing solution 404. In the preferred embodiment, as illustrated, the applicator 406 comprises a slot coater device. In alternative embodiments, the applicator 406 comprises an ink jet applicator, a tank, an aerosol applicator, drip applicator, sponge applicator, or any other suitable device for applying the processing solution 404 to the film 106. The fluid delivery system 408 delivers the processing solution 404 from the reservoir 410 to the applicator 406. In an embodiment in which the applicator 406 comprises a slot coater device, the fluid delivery system 408 generally delivers the processing solution 404 at a constant volumetric flow rate to help insure uniformity of coating of processing solution 404 on the film 106. The reservoir 410 contains a sufficient volume of processing solution 404 to process multiple rolls of film 106. In the preferred embodiment, the reservoir 410 comprises a replaceable cartridge. In other embodiments, the reservoir 410 comprises a refillable tank. The applicator station 400 may comprise other suitable systems and devices for applying the processing solution 404 to the film 106.

The development station 402 operates to give the film 106 time to develop prior to being scanned by the scanning system 124. In the embodiment illustrated, the development station 402 forms that portion of the transport system 120 between the applicator 406 and the scanning system 124. The length of the development station 402 is generally dependent upon the development time of the film 106. In particular, depending upon the environment and chemical nature of the processing solution 404, development of the film 106 may require as little as a few seconds to as long as several minutes.

As illustrated, the development station 402 comprises a cover 412 that protects the film 106 during development. The cover 412 forms an environmental chamber 414 surrounding the film 106. The temperature and humidity within the environmental chamber 414 are strictly controlled. To facilitate controlling the temperature and humidity, the environmental chamber 414 has a minimum volume surrounding the film 106. The cover 412 may be insulated to maintain a substantially constant temperature as the film 106 is developed. In order to maintain the temperature, the development station 402 preferably includes a heating system 416. As illustrated, the heating system 416 may include a heated roller 418 and heating element 420. In addition, the heating system 416 may include a processing solution heating system (not expressly shown) that heats the processing solution 404 prior to its application to the film 106.

In operation, transport system 120 transports the film 106 through the applicator station 400. Fluid delivery system 408 dispenses the processing solution 404 from the reservoir 410 through the applicator 406 onto the film 106. The processing solution 404 initiates development of the dye image and silver image within the film 106. The coated film 106 is then transported through the development station 402. As discussed above, the development station 402 allows the film 106 time to develop within a controlled environment. The film 106 is then transported by the transport system 120 to the scanning system 124. As described above, the processing solution 404 coated on the film 106 is not removed, but remains on the film 106 as the film 106 is transported to the scanning system 124.

FIG. 2B illustrates an alternative development system 122b. In this embodiment, the development system 122b comprises an applicator station 400, a development station 402, and a halt station 422. The developer applicator station 400 and the development station 402 were previously discussed in FIG. 2A. The applicator station 400 again applies the processing solution 404 to the film 106 that initiates development of the silver image and dye image within the film 106. Halt station 422 operates to retard or substantially stop the continued development of the film 106. Retarding or substantially stopping the continued development of the film 106 increases the amount of time the film 106 can be exposed to visible light without substantially fogging of the film 106. FIGS. 2B-1–B4 illustrate different examples of the halt station 422.

FIG. 2B-1 illustrates a halt station 422a that operates to apply at least one halt solution 424 to the film 106 coated with processing solution 404. The halt solution 424 retards or substantially stops the continued development of the film 106. In the embodiment illustrated, the halt station 422a comprises an applicator 406b, a fluid delivery system 408b, and a reservoir 410b, similar in function and design as described in FIG. 2A. Although a single applicator 406b, fluid delivery system 408b, and reservoir 410b are illustrated, the halt station 422a may comprise any number of applicators 406b, fluid delivery systems 408b, and reservoirs 410b that apply other suitable halt solutions 424 and other suitable solutions.

In one embodiment, the halt solution 424 comprises a bleach solution. In this embodiment, the bleach solution substantially oxidizes the metallic silver grains forming the silver image into a silver compound, which may improve the transmission of light through the film 106 during the scanning operation. In another embodiment, the halt solution 424 comprises a fixer solution. In this embodiment, the fixer solution substantially dissolves the silver halide, which can also improve the transmission of light through the film 106. In yet another embodiment, multiple halt solutions 424 are applied to the film 106. For example, a fixer solution can be applied to the film 106 and then a stabilizer solution can be applied to the film 106. In this example, the addition of the stabilizer desensitizes the silver halide within the film 106 and may allow the film 106 to be stored for long periods of time without sensitivity to light. The halt solution 424 may comprise any other suitable processing solution. For example, the halt solution 424 may comprise an aqueous solution, a blix solution (mixture of bleach and fix solutions), a stop solution, or any other suitable solution or combination of processing solutions for retarding or substantially stopping the continued development of the film 106.

FIG. 2B-2 illustrates a halt station 422b that operates to chill the developing film 106. Chilling the developing film 106 substantially slows the chemical developing action of the processing solution 404. In the embodiment illustrated, the chill station 422b comprises an electrical cooling plate 426 and insulation shield 428. In this embodiment, the cooling plate 426 is electronically maintained at a cool temperature that substantially arrests the chemical reaction of the processing solution 404. The insulation shield 428 substantially reduces the heat transfer to the cooling plate 426. The chill halt station 422b may comprise any other suitable system and device for chilling the developing film 106.

FIG. 2B-3 illustrates a halt station 422c that operates to dry the processing solution 404 on the coated film 106. Drying the processing solution 404 substantially stops further development of the film 106. In the embodiment illustrated, the halt station 422c comprises an optional cooling plate 426, as described in FIG. 2B-2, and a drying system 430. Although heating the coated film 106 would facilitate drying the processing solution 404, the higher temperature would also have the effect of accelerating the chemical reaction of the processing solution 404 and film 106. Accordingly, in the preferred embodiment, the film 106 is cooled to retard the chemical action of the processing solution 404 and then dried to effectively freeze-dry the coated film 106. Although chilling the film 106 is preferred, heating the film 106 to dry the film 106 can also be accomplished by incorporating the accelerated action of the developer solution 404 into the development time for the film 106. In another embodiment in which a suitable halt solution 424 is applied to the film 106, the chemical action of the processing solution 404 is already minimized and the film 106 can be dried using heat without substantially effecting the development of the film 106. As illustrated, the drying system 430 circulates air over the film 106 to dry the processing solution 404 and depending upon the embodiment, the halt solution 424. The halt station 422c may comprise any other suitable system for drying the film 106.

FIG. 2B-4 illustrates a halt station 422d that operates to substantially remove excess processing solution 404, and any excess halt solution 424, from the film 106. The halt station 422d does not remove the solutions 404, 424 that are absorbed into the film 106. In other words, even after the wiping action, the film 106 includes some solution 404, 424. Removing any excess processing solution 404 will retard the continued development of the film 106. In addition, wiping any excess solutions 404, 424 from the film 106 may improve the light reflectance and transmissivity properties of the coated film 106. In particular, removal of the excess solutions 404, 424 may reduce any surface irregularities in the coating surface, which can degrade the scanning operations described in detail in FIGS. 3 and 4. In the embodiment illustrated, the halt station 422d comprises a wiper 432 operable to substantially remove excess processing solution 404 and any halt solution 424. In a particular embodiment, the wiper 432 includes an absorbent material that wicks away the excess solutions 404, 424. In another embodiment, the wiper 432 comprises a squeegee that mechanically removes substantially all the excess solutions 404, 424. The halt station 422d may comprise any suitable device or system operable to substantially remove any excess solutions 404, 424.

Although specific embodiments of the halt station 422 have been described above, the halt station 422 may comprise any suitable device or system for retarding or substantially stopping the continued development of the film 106. In particular, the halt station 422 may comprise any suitable combination of the above embodiments. For example, the halt station 422 may comprise an applicator station 400b for applying a halt solution 424, a cooling plate 426, and a drying system 430. As another example, the halt station 422 may comprise a wiper 432 and a drying system 430.

FIG. 3 is a diagram of the scanning system 124. Scanning system 124 comprises one or more scanning stations 500. Individual scanning stations 500 may have the same or different architectures and embodiments. Each scanning station 500 comprises a lighting system 502 and a sensor system 504. The lighting system 502 includes one or more light sources 506 and optional optics 508. The sensor system 504 includes one or more detectors 510 and optional optics 512. In operation, the lighting system 502 operates to produce suitable light 520 that is directed onto the film 106. The sensor system 504 operates to measure the light 520 from the film 106 and produce sensor data 116 that is communicated to the to the data processing system of the improved digital film processing system disclosed herein.

Each scanning station 500 utilizes electromagnetic radiation, i.e., light, to scan the film 106. Individual scanning stations 500 may have different architectures and scan the film 106 using different colors, or frequency bands (wavelengths), and color combinations. In particular, different colors of light interact differently with the film 106. Visible light interacts with the dye image and silver within the film 106. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 500 may utilize other suitable colors and wavelengths (frequency) ranges without departing from the spirit and scope of the invention.

The light source 506 may comprise one or more devices or a system that produces suitable light 520. In the preferred embodiment, the light source 506 comprises an array of light-emitting diodes (LEDs). In this embodiment, different LEDs within the array may be used to produce different colors of light 520, including infrared light. In particular, specific colors of LEDs can be controlled to produce short duration pulses of light 520. In another embodiment, the light source 506 comprises a broad spectrum light source 506, such as a fluorescent, incandescent, tungsten-halogen, direct gas discharge lamps, and the like. In this embodiment, the sensor system 504 may include filters for spectrally separating the colors of light 520 from the film 106. For example, as described below, a RGB filtered trilinear array of detectors may be used to spectrally separate the light 520 from the film 106. In another embodiment of a broad-spectrum light source, the light source 506 includes a filter, such as a color wheel, to produce the specified colors of light 520. In yet another embodiment, the light source 506 comprises a point light source, such as a laser. For example, the point light source may be a gallium arsenide or an indium gallium phosphide laser. In this embodiment, the width of the laser beam is preferably the same size as a pixel on the film 106 (~12 microns). Filters, such as a color wheel, or other suitable wavelength modifiers or limiters maybe used to provide the specified color or colors of light 520.

Optional optics 508 for the lighting system 502 directs the light 520 to the film 106. In the preferred embodiment, the optics 508 comprises a waveguide that directs the light 520 onto the film 106. In other embodiment, the optics 520 includes a lens system for focusing the light 520. In a particular embodiment, the lens system includes a polarizing filter to condition the light 520. The optics 508 may also include a light baffle 522a. The light baffle 522a constrains illumination of the light 520 within a scan area in order to reduce light leakage that could cause fogging of the film 106. In one embodiment, the light baffle 522a comprises a coated member adjacent the film 106. The coating is generally a light absorbing material to prevent reflecting light 520 that could cause fogging of the film 106.

The detector 510 comprises one or more photodetectors that convert light 520 from the film 106 into data signals 116. In the preferred embodiment, the detector 510 comprises a linear charge coupled device (CCD) array. In another embodiment, the detector 510 comprises an area array. The detector 510 may also comprise a photodiode, phototransistor, photoresistor, and the like. The detector 510 may include filters to limit the bandwidth, or color, detected by individual photodetectors. For example, a trilinear array often includes separate lines of photodetectors with each line of photodetectors having a color filter to allow only one color of light to be measured by the photodetector.

Specifically, in a trilinear array, the array generally includes individual red, green, and blue filters over separate lines in the array. This allows the simultaneous measurement of red, green, and blue components of the light 520. Other suitable types of filters may be used. For example, a hot mirror and a cold mirror can be used to separate infrared light from visible light.

Optional optics 512 for the sensor system 504 directs the light 520 from the film 106 onto the detector 510. In the preferred embodiment, the optics 512 comprises a lens system that directs the light 520 from the film 106 onto the detector 510. In a particular embodiment, the optics 512 include polarized lenses. The optics 512 may also include a light baffle 522b. The light baffle 522b is similar in function to light baffle 522a to help prevent fogging of the film 106.

As discussed previously, individual scanning stations 500 may have different architectures. For example, light 520 sensed by the sensor system 504 may be transmitted light or reflected light. Light 520 reflected from the film 106 is generally representative of the emulsion layer on the same side of the film 106 as the sensor system 504. Specifically, light 520 reflected from the front side (emulsion side) of the film 106 represents the blue sensitive layer and light 520 reflected from the back side of the film 106 represents the red sensitive layer. Light 520 transmitted through the film 106 collects information from all layers of the film 106. Different colors of light 520 are used to measure different characteristics of the film 106. For example, visible light interacts with the dye image and silver within the film 106, and infrared light interacts with the silver in the film 106.

Different architectures and embodiments of the scanning station 500 may scan the film 106 differently. In particular, the lighting system 502 and sensor system 504 operate in concert to illuminate and sense the light 520 from the film 106 to produce suitable sensor data 116. In one embodiment, the lighting system 502 separately applies distinct colors of light 520 to the film 106. In this embodiment, the sensor system 504 generally comprises a non-filtered detector 510 that measures in series the corresponding colors of light 520 from the film 106. In another embodiment, multiple unique color combinations are simultaneously applied to the film 106, and individual color records are derived from the sensor data 116. In another embodiment, the lighting system 502 simultaneously applies multiple colors of light 520 to the film 106. In this embodiment, the sensor system 504 generally comprises a filtered detector 510 that allows the simultaneous measurement of individual colors of light 520. Other suitable scanning methods may be used to obtain the required color records.

The use of the halt station 422 may improve the scanning properties of the film 106 in addition to retarding or substantially stopping the continued development of the film 106. For example, the intensity of light 520 transmitted through the film 106 may be partially blocked, or occluded, by the silver within the film 106. In particular, both the silver image and silver halide within the film 106 occlude light 520. On the whole, the silver image within the film 106 absorbs light 520, and the silver halide reflects light 520. The halt solutions 424 may be used to improve the scanning properties of the film 106. For example, applying a bleach solution to the film 106 reduces the optical density of the silver image within the film 106. Applying a fixer solution to the film 106 reduces optical density of silver halide within the film 106. Another method for improving the scanning properties of the film 106 is drying the film 106. Drying the film 106 improves the clarity of the film 106.

As described above, the scanning system 124 may include one or more individual scanning stations 500. Specific examples of scanner station 500 architectures are illustrated in FIGS. 4A–4D. The scanning system 124 may comprise any illustrated example, combination of examples, or other suitable methods or systems for scanning the film 106.

Figure 4A:
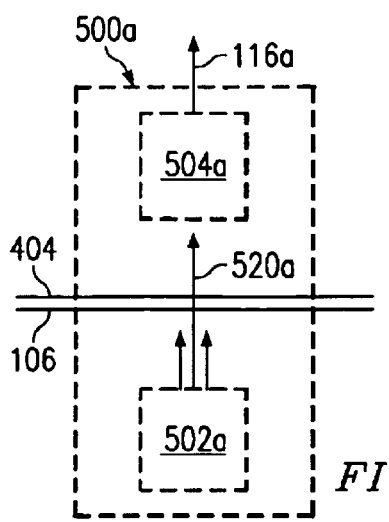
FIGS. 4A–4D are schematic diagrams illustrating various embodiments of a scanning station shown in FIG. 3.

FIG. 4A is a schematic diagram illustrating a scanning station 500a having a transmission architecture. As illustrated, the transmission scanning station 500a comprises a lighting system 502a and a sensor system 504a. Lighting system 502a produces light 520a that is transmitted through the film 106 and measured by the sensor system 504a. The sensor system 504a produces sensor data 116a that is communicated to the data processing system of the improved digital film processing system disclosed herein. Lighting system 502a and sensor system 504a are similar in design and function as lighting system 502 and sensor system 504, respectively. Although FIG. 4A illustrates the light 520a being transmitted through the film 106 from the backside to the frontside of the film 106, the light 520a can also be transmitted through the film 106 from the frontside to the backside of the film 106 without departing from the scope of the invention.

In one embodiment of the scanning station 500a, the light 520a produced by the lighting system 502a comprises visible light. The visible light 520a may comprise broadband visible light, individual visible light colors, or combinations of visible light colors. The visible light 520a interacts with the silver and at least one dye cloud within the film 106. In particular, depending upon the embodiment of the development system 122, the silver remaining in the film 106 may be metallic silver, silver compound, or both.

In an embodiment in which the visible light 520a interacts with the magenta, cyan and yellow dye images within the film 106, as well as the silver within the film 106, the sensor system 504a records the intensity of visible light 520a from the film 106 and produces sensor data 116a. The sensor data 116a generally comprises a red, green, and blue record corresponding to the cyan, magenta, and yellow dye images, respectively. Each of the red, green, and blue records includes a silver record. As previously discussed, the silver partially occludes the visible light 520a being transmitted through the film 106. Accordingly, the red, green, and blue records are generally processed by the data processing system of the improved digital film processing system disclosed herein to correct the records for the occlusion caused by the silver image in the film 106.

In the preferred embodiment of the transmission scanning station 500a, the light 520a produced by the lighting system 502a comprises visible light and infrared light. As discussed above, the visible light may comprise broadband visible light, individual visible light colors, or combinations of visible light colors. The infrared light may comprise infrared, near infrared, or any suitable combination. The visible light 520a interacts with the silver and at least one dye image, i.e. cyan, magenta, or yellow dye images, within the film 106 to produce a red, green, and/or blue record that includes a silver record. The infrared light interacts with the silver within the film 106 and produces a silver record. The silver image record can then be used to remove, at least in part, the silver metal record contained in the red, green, and blue records. This embodiment is analogous to the defect correction electronic scanners described in U.S. Pat. No. 5,266,805, entitled System and Method for Image Recovery, which is hereby incorporated herein by reference. In this embodiment, the silver is analogous to a defect that obstructs the optical path of the infrared light. The amount of occlusion is used as a basis for modifying the color records. For example, in pixels having a high silver density, the individual color records are significantly increased, whereas in pixels having a low silver density, the individual color records are relatively unchanged.

In yet another embodiment of the transmission scanning station 500a, the light produced by the lighting system 502a comprises infrared or near infrared light. In this embodiment, the infrared light 520a interacts with the silver image in the film 106 but does not substantially interact with the dye images within the film 106. In this embodiment, the sensor data 116a does not spectrally distinguish the magenta, cyan, and yellow dye images. An advantage of this embodiment is that the infrared light 520a does not fog the film 106. In a particular embodiment, the advantage of not fogging the film 106 allows the film 106 to be scanned at multiple development times without significantly fogging the film 106. In this embodiment, the scanning station 500a can be used to determine the optimal development time for the film 106. This embodiment may optimally be used to determine the optimal development time of the film 106, which can then be scanned using another scanning station 500

Figure 4B:
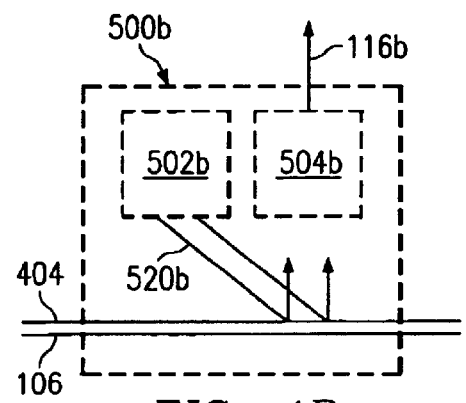

FIG. 4B is a schematic diagram illustrating a scanning station 500b having a reflection architecture. The reflective scanning station 500b comprises a lighting system e 502b and a sensor system 504b. Lighting system 502b produces light 520b that is reflected from the film 106 and measured by the sensor system 504b. The sensor system 504b produces sensor data 116b that is communicated to the data processing system of the improved digital film processing system disclosed herein. Lighting system 502b and sensor system 504b are similar to lighting system 502 and sensor system 504, respectively.

In one embodiment of the reflective scanning station 500b used to scan the blue emulsion layer of the film 106, the light 520b produced by the lighting system 502b comprises blue light. In this embodiment, the blue light 520b scans the silver image and dye image within the blue layer of the film 106. The blue light 520b interacts with the yellow dye image and also the silver in the blue emulsion layer. In particular, the blue light 520b is reflected from the silver halide and measured by the sensor system 504b to produce a blue record. Many conventional films 106 include a yellow filter below the blue emulsion layer that blocks the blue light 520a from illuminating the other emulsion layers of the film 106. As a result, noise created by cross-talk between the blue emulsion layer and the red and green emulsion layers is substantially reduced.

In another embodiment of the reflective scanning station 500b used to scan the blue emulsion layer of the film 106, the light 520b produced by the lighting system 502b comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 106. In this embodiment, the non-blue light 520b interacts with the silver image in the blue emulsion layer of the film 106, but is transparent to the yellow dye within the blue emulsion layer of the film 106. This embodiment is prone to higher noise levels created by cross-talk between the blue and green emulsion layers of the film 106.

In yet another embodiment of the reflective scanning station 500b, the light 520b produced by the lighting system 502b comprises visible and infrared light. In this embodiment, blue light interacts with the yellow dye image and the silver image in the blue emulsion layer, green light interacts with magenta dye image and the silver image in each of the emulsion layers, red light interacts with the cyan dye image and the silver in each of the emulsion layers, and the infrared light interacts with the silver in each emulsion layer of the film 106. In this embodiment, the sensor system 504b generally comprises a filtered detector 510b (not expressly shown) that measures the red, green, blue, and infrared light 520b from the film 106 to produce red, green, blue, and infrared records as sensor data 116b.

Although the scanning station 500b is illustrated with the lighting system 502b and the sensor system 504b located on front side of the film 106, the lighting system 502b and the sensor system 504b may also be located on the back side of the film 106. In one embodiment, the light 520b produced by the lighting system 502b may comprise red light. The red light largely interacts with the cyan dye image and silver in the red emulsion layer of the film 106 to produce a red record of the sensor data 116b.

Figure 4C:
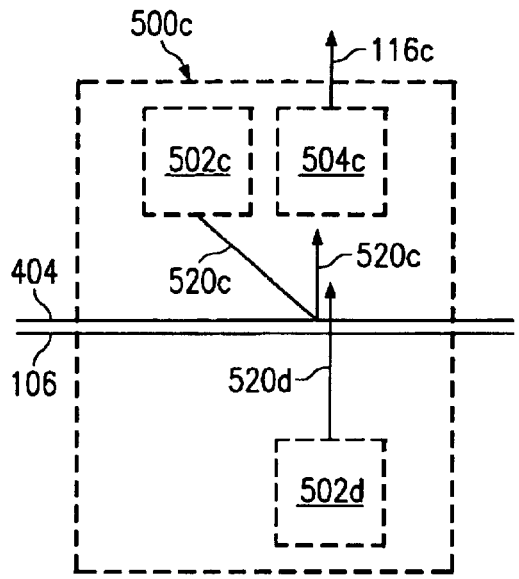

FIG. 4C is a schematic diagram illustrating a scanning station 500c having a transmission-reflection architecture. In this embodiment, the scanning station 500c comprises a first lighting system 502c, a second lighting system 502d, and a sensor system 504c. In the preferred embodiment, the lighting system 502c operates to illuminate the front side of the film 106 with light 520c, the second lighting system 502d operates to illuminate the backside of the film 106 with light 520d, and the sensor system 504c operates to measure the light 520c reflected from the film 106 and the light 520d transmitted through the film 106. Based on the measurements of the light 520b, 520d, the sensor system 504c produces sensor data 116c that is communicated to the data processing system of the improved digital film processing system disclosed herein. Lighting system 502c and 502d are similar to lighting system 502, and sensor system 504c is similar to the sensor system 504. Although scanning station 500c is illustrated with lighting systems 502c, 502d, a single light source may be used to produce light that is directed through a system of mirrors, shutters, filters, and the like, to illuminate the film 106 with the front side of the film 106 with light 520c and illuminate the back side of the film 106 with light 520d. The light 520c, 520d may comprise any color or color combinations, including infrared light.

This embodiment of the scanning station 500c utilizes many of the positive characteristics of the transmission architecture scanning station 500a and the reflection architecture scanning station 500b. For example, the blue emulsion layer is viewed better by light 520c reflected from the film 106 than by light 520d transmitted through the film 106; the green emulsion layer is viewed better by light 520d transmitted through the film 106 than by light 520c reflected from the film 106; and the red emulsion layer is adequately viewed by light 520d transmitted through the film 106. In addition, the cost of the scanning station 500c is minimized through the use of a single sensor system 504c.

In the preferred embodiment of the scanning station 500c, the light 520c comprises blue light, and light 520d comprises red, green, and infrared light. The blue light 520c interacts with the yellow dye image and silver in the blue emulsion layer of the film 106. The sensor system 504c measures the light 520c from the film 106 and produces a blue-silver record. The red and green light 520d interacts with the cyan and magenta dye images, respectively, as well as the silver in the film 106. The infrared light 520d interacts with the silver, but does not interact with the dye clouds within the film 106. As discussed previously, the silver contained within the film 106 may comprise silver grains, silver halide, or both. The red, green, and infrared light 520d transmitted through the film 106 is measured by the sensor system 504c, which produces a red-silver, green-silver, and silver record. The blue-silver, red-silver, green-silver, and silver records form the sensor data 116c that is communicated to the data processing system of the improved digital film processing system disclosed herein. The data processing system of the improved digital film processing system disclosed herein utilizes the silver record to facilitate removal of the silver component from the red, green, and blue records.

In another embodiment, the light 520c comprises blue light and infrared light, and light 520d comprises red, green, and infrared light. As discussed previously, the blue light 520c mainly interacts with the yellow dye image and silver within the blue emulsion layer of the film 106. The infrared light 520c interacts with mainly the silver in the blue emulsion layer of the film 106. The sensor system 504c measures the blue and infrared light 520c from the film 106 and produces a blue-silver record and a front side silver record, respectively. The red, green, and infrared light 520d interact with the film 106 and are measured by the sensor system 504c to produce red-silver, green-silver and transmitted-silver records as discussed above. The blue-silver, red-silver, green-silver, and both silver records form the sensor data 116c that is communicated to the data processing system of the improved digital film processing system disclosed herein. In this embodiment, the data processing system of the improved digital film processing system disclosed herein utilizes the front side silver record of the blue emulsion layer to facilitate removal of the silver component from the blue-silver record, and the transmission-silver record is utilized to facilitate removal of the silver component from the red and green records.

Although the scanning station 500c is described in terms of specific colors and color combinations of light 520c and light 520d, the light 520c and light 520d may comprise other suitable colors and color combinations of light without departing from the scope of the invention. For example, light 520c may comprise non-blue light, infrared light, broadband white light, or any other suitable light. Likewise, light 520d may include blue light, broadband white light, or another other suitable light. Scanning station 500c may also comprise other suitable embodiments without departing from the scope of the invention. For example, although the scanning station 500c is illustrated with two lighting systems 502 and a single sensor system 504, the scanning station 500c could be configured with a single lighting system 502 and two sensor systems 504, wherein one sensor system measures light 520 reflected from the film 106 and the second sensory system 504 measures light 520 transmitted through the film 106. In addition, as discussed above, the scanning station 500 may comprise a single lighting system that illuminates the film 106 with light 520c and light 520d.

Figure 4D:
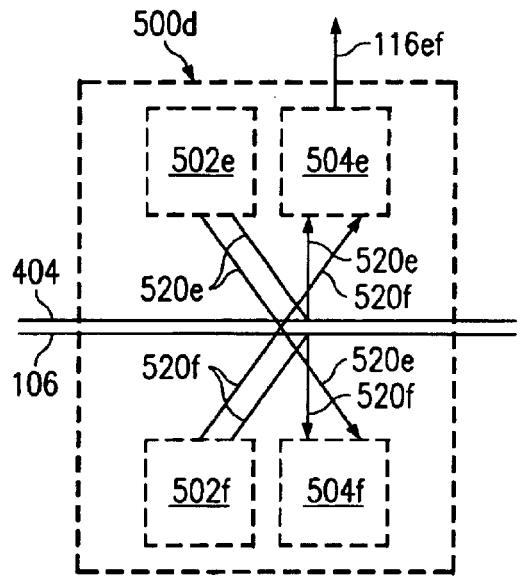

FIG. 4D is a schematic diagram illustrating a scanning station 500d having a reflection-transmission-reflection architecture. In this embodiment, the scanning station 500d comprises a first lighting system 502e, a second lighting system 502f, a first sensor system 504e, and a second sensor system 504f. In the embodiment illustrated, the lighting system 502e operates to illuminate the front side of the film 106 with light 520e, and the second lighting system 502f operates to illuminate the back side of the film 106 with light 520f. The first sensor system 504e operates to measure the light 520e reflected from the film 106 and the light 520f transmitted through the film 106, and the second sensor system 504f operates to measure the light 520f reflected from the film 106 and the light 520e transmitted through the film 106. Based on the measurements of the light 520e and 520f, the sensor systems 504e, 504f produce sensor data 116ef that is communicated to the data processing system of the improved digital film processing system disclosed herein. Lighting systems 502e, 502f are similar to lighting systems 502, and sensor systems 504e, 504f are similar to the sensor system 504. Although scanning station 500d is illustrated with lighting systems 502e, 502f, and sensor systems 504e, 504f, a single lighting system and/or sensory system, respectively, may be used to produce light that is directed through a system of mirrors, shutters, filters, and the like, to illuminate the film 106 with the frontside of the film 106 with light 520e and illuminate the backside of the film 106 with light 520f.

This embodiment of the scanning station 500d expands upon the positive characteristics of the transmission-reflection architecture of scanning station 500c. For example, as discussed in reference to FIG. 4C, the blue emulsion layer is viewed better by light 520e reflected from the film 106 and the green emulsion layer is viewed better by light 520e or 520f transmitted through the film 106. Second sensor system 504f allows viewing of the red emulsion layer by light 520f reflected from the film 106, which generally produces better results than viewing the red emulsion layer by light 520e or light 520f transmitted through the film 106.

In the preferred embodiment of the scanning station 500d, the sensor systems 504e, 504f include a trilinear array of filtered detectors, and the light 520e and the light 520f comprises broadband white light and infrared light. The trilinear array operates to simultaneously measure the individual red, green, and blue components of the broadband white light 520e, 520f. The infrared light is measured separately and can be measured through each filtered detector 510 of the sensor systems 504e, 504f. The broadband white light 520e, 520f interacts with the silver and magenta, cyan, and yellow color dyes in the film 106, respectively, and the infrared light 520e, 520f interacts with the silver within the film 106. The reflected white light 520e measured by the first sensor system 504e includes information corresponding to the yellow dye image and the silver in the blue emulsion layer of the film 106. In particular, the blue component of the broadband white light 520e measured by the blue detector of the sensor system 504e corresponds to the yellow dye image, and the non-blue components of the broadband white light 520e measured by the red and green detectors corresponds to the red and green dye images and all the silver within the emulsion layers of the film 106. Similarly, the red component of the broadband white light 520f measured by the red detector of the sensor system 504f corresponds largely to the cyan dye image, and the non-red components of the broadband white light 520e measured by the blue and green detectors corresponds to the yellow and magenta dye images and all the silver within the emulsion layers of the film 106. The white light 520e, 520f transmitted through the film 106 interacts with each color dye image and silver within the film 106, and the red, green, and blue light components are measured by the red, green, and blue detectors of the sensor systems 504e, 504f to produce individual red, green and blue light records that include the silver record. The infrared light 520e reflected from the film 106 and measured by the sensor system 504e corresponds largely to the silver in the blue emulsion layer of the film 106, and the infrared light 520f reflected from the film 106 and measured by the sensor system 504f largely corresponds to the silver in the red emulsion layer of the film 106. The infrared light 520e, 520f transmitted through the film 106 measured by the sensor systems 504e, 504f corresponds to the silver in the red, green, and blue emulsion layers of the film 106. The individual measurements of the sensor systems 504e, 504f are communicated to the data processing system of the improved digital film processing system disclosed herein as sensor data 116ef. The data processing system of the improved digital film processing system disclosed herein processes the sensor data 116ef and constructs the digital image using the various sensor system measurements. For example, the blue signal value for each pixel can be calculated using the blue detector data from the reflected light 520e and the blue detector data from the transmitted light 520f, as modified by non-blue detector data from the reflected light 520e, and the non-blue detector data from the transmitted light 520e or 520f. The red and green signal values for each pixel can be similarly calculated using the various measurements.

In another embodiment of the scanning station 500d, the sensor system 504e, 504f include a trilinear array of filtered detectors, and the light 520e and the light 520f comprises broadband white light. This embodiment of the scanning station 500d operates in a similar manner as discussed above, with the exception that infrared light is not measured or used to calculate the digital image. Although the scanning station 500d is described in terms of a specific colors and color combinations of light 520e and light 520f, the light 520e and light 520f may comprise other suitable colors and color combinations of light without departing from the scope of the invention. Likewise, the scanning station 500d may comprise other suitable devices and systems without departing from the scope of the invention.

Figure 5A:
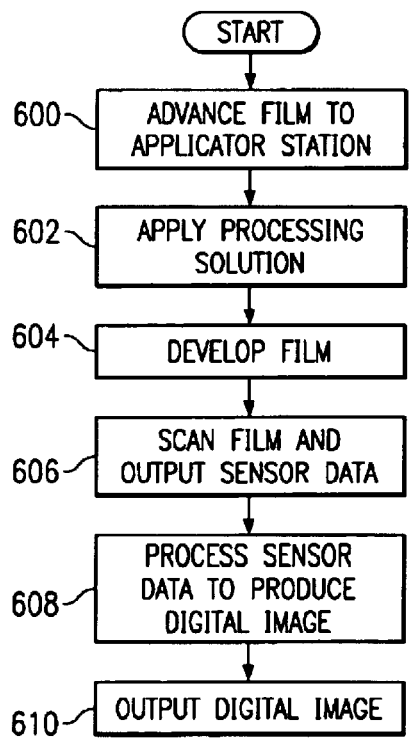
FIGS. 5A–5B are flow charts illustrating various methods of improved digital film development in accordance with the invention.

FIG. 5A is a flowchart of one embodiment of a method for developing and processing film. This method may be used in conjunction with one or more embodiments of the improved digital film development system as disclosed herein, which includes a data processing system and a film processing system having a transport system, a development system, and a scanning system. The development system includes an applicator station 400 for applying a processing solution 404 to the film 106 and a development station 402. The scanning system 124 comprises a single scanning station 500 operable to scan the film 106 with light 520 having a frequency (wavelength) within the visible light spectrum and produce sensor data 116 that is communicated to the data processing system. The data processing system processes the sensor data 116 to produce a digital image that may be output to an output device.

The method begins at step 600, where the transport system 120 advances the film 106 to the applicator station 400. Film 106 is generally fed from a conventional film cartridge and advanced by the transport system of the improved digital film processing system disclosed herein through the various stations of the film processing system of the improved digital film processing system disclosed herein. At step 602, processing solution 4.04 is applied to the film 106. The processing solution 404 initiates production of silver and at least one dye image within the film 106. The processing solution 404 is generally applied as a thin coating onto the film 106, which is absorbed by the film 106. At step 604, the film 106 is advanced through the development station 402 where the dye images and silver grains develop within the film 106. The environmental conditions, such as the temperature and humidity, are generally controlled within development station 402. This allows the film 106 to develop in a controlled and repeatable manner and provides the proper development time for the film 106. At step 606, the film 106 is scanned by the scanning system 124 using light 520 having at least one frequency within the visible portion of the electromagnetic spectrum, i.e., visible light. The visible light interacts with at least one dye image within the film 106 and also the silver within the film 106. In some embodiments, the light 520 used to scan the film 106 also includes infrared light. Infrared light interacts with the silver, but is substantially unaffected by the dye images within the film 106. As discussed in reference to FIGS. 4A–4D, the film 106 can be scanned in a number of different ways embodied in a number of different architectures, each with their own advantages. Sensor data 116 is produced by the scanning system 124 and communicated to the data processing system of the improved digital film processing system disclosed herein. At step 608, the sensor data 116 is processed to produce the digital image. The data processing system of the improved digital film processing system disclosed herein includes image processing software that processes the sensor data 116 to produce the digital image. The digital image represents the photographic image recorded on the film 106. At step 610, the digital image is output to one or more output devices, such as a monitor, a printer, a network system, a storage device, a computer system, and the like.

Figure 5B:
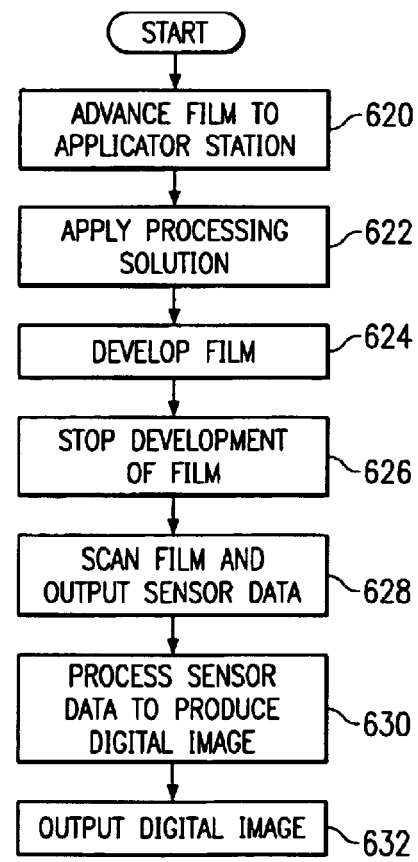

FIG. 5B is a flowchart of another embodiment of a method for developing and processing film. This method may be used with one or more embodiments of the improved digital film development system as disclosed herein, which includes the development system 122 having the halt station 422. This method is similar to the method described in FIG. 5A, with the exception that development of the film 106 is substantially stopped by the halt station 422.

The method begins at step 620, where the transport system 120 advances the film 106 to the applicator station 400. At step 622, processing solution 404 is applied to the film 106. The processing solution 404 initiates production of silver grains and at least one dye image within the film 106. At step 624, the film 106 is advanced through the development station 402 where the dye images and silver develop within the film 106. At step 626, the continued development of the film 106 is retarded or substantially stopped by the halt station 422. Retarding or substantially stopping the continued development of the film 106 allows the film 106 to be scanned using visible light 520 without fogging the film 106 during the scanning process. For example, if the development of the film 106 is stopped, the film 106 can be exposed to visible light without negatively affecting the scanning process. The halt station 422 may comprise a number of embodiments. For example, the halt station 422 may apply a halt solution 424, such as a bleach solution, fixer solution, blix solution, stop solution and the like. The halt solution 424 may also operate to stabilize the film 106. The halt station 422 may also comprise a wiper, drying system, cooling system and the like. At step 628, the film 106 is scanned by the scanning system 124 using light 520 having at least one frequency within the visible portion of the electromagnetic spectrum, i.e., visible light. At step 630, the sensor data 116 is processed to produce the digital image 108. At step 632, the digital image is output to one or more output devices, such as a monitor, a printer, a network system, a storage device, a computer system, and the like.

While the invention has been particularly shown and described in the foregoing detailed description, it will be understood by those skilled in the art that various other changes in form and detail may be made without departing from the spirit and scope of the invention.

What is claimed is:

1. A method for preparing a roll of film for being processed, the method comprising:

predictively positioning a tongue of a roll of film relative to a film magazine, wherein the roll of film is contained in the film magazine;

performing a first tongue extraction operation to enable an extraction of a tongue of the roll of film through a light-proof window of the film magazine;

rotating the roll of film through a prescribed angle in response to the tongue of said film remaining in the film magazine after performing the first tongue extraction operation; and performing a second tongue extraction operation to extract the tongue of the roll of film through said window.

2. A method of predictively positioning a tongue of a roll of film, the method comprising:

rotating a roll of film contained in a film magazine, wherein the film magazine includes a light-proof window therein;

capturing an acoustic pattern generated by the roll of film in response to the rotating of the roll of film;

correlating the acoustic pattern to a predicted angular position of the roll of film relative to the light-proof window; and rotating the roll of film to the predicted angular position, wherein a tongue of said film is predicted to be positioned in a desired orientation relative to the light-proof window when the roll of film is at the predicted angular position.

3. A method for preparing a roll of film for development, the method comprising:

receiving a film magazine having a roll of film therein at a film unload station of a film processing system;

extracting a tongue at a leading end of said film from said magazine;

unwinding the film from said magazine;

cutting a trailing end of the film;

reversing the film so that the trailing end of the film is now a new leading end of the film;

transporting the new leading end of the film to a leader splicing apparatus of the film processing system; and splicing the new leading end of the film to a trailing end of a leader.

4. A method according to claim 3, further comprising:

monitoring a length of the film during the unwinding step of the film;

wherein said cutting step comprises cutting said trailing end of the film when a monitored length of the film is within a predetermined range.

* * * * *